US007236982B2

(12) United States Patent
Zlatanov et al.

(10) Patent No.: US 7,236,982 B2
(45) Date of Patent: Jun. 26, 2007

(54) COMPUTER SYSTEMS AND METHODS FOR PLATFORM INDEPENDENT PRESENTATION DESIGN

(75) Inventors: Teodore Zlatkov Zlatanov, Braintree, MA (US); Christopher Furlong, West Hollywood, CA (US)

(73) Assignee: Pic Web Services, Inc., Wilmington, DE (US)

( * ) Notice: Subject to any disclaimer, the term of this patent is extended or adjusted under 35 U.S.C. 154(b) by 316 days.

(21) Appl. No.: 10/663,571

(22) Filed: Sep. 15, 2003

(65) Prior Publication Data

US 2005/0060277 A1    Mar. 17, 2005

(51) Int. Cl.
*G06F 15/00* (2006.01)
*G06F 17/00* (2006.01)

(52) U.S. Cl. .................. 707/102; 707/104.1; 707/100; 715/520; 715/517; 715/523; 715/509; 715/519; 715/513; 715/521

(58) Field of Classification Search ................ 715/520, 715/517, 523, 509, 519, 513, 521; 707/104.1, 707/100, 102
See application file for complete search history.

(56) References Cited

U.S. PATENT DOCUMENTS

| | | | | |
|---|---|---|---|---|
| 4,910,669 A * | 3/1990 | Gorin et al. ................... 712/17 |
| 5,050,074 A * | 9/1991 | Marca ............................ 707/8 |
| 5,181,162 A * | 1/1993 | Smith et al. ................ 715/530 |
| 5,455,945 A * | 10/1995 | VanderDrift ................... 707/2 |
| 5,655,130 A * | 8/1997 | Dodge et al. ............... 715/511 |
| 5,664,182 A * | 9/1997 | Nierenberg et al. ......... 707/102 |
| 5,852,450 A * | 12/1998 | Thingvold ................... 345/473 |
| 5,895,476 A | 4/1999 | Orr et al. |
| 5,956,737 A | 9/1999 | King et al. |
| 6,014,680 A * | 1/2000 | Sato et al. ................... 715/513 |
| 6,046,740 A * | 4/2000 | LaRoche et al. ............ 715/764 |
| 6,088,708 A * | 7/2000 | Burch et al. ................ 715/509 |
| 6,185,550 B1 * | 2/2001 | Snow et al. ................... 707/1 |
| 6,202,072 B1 * | 3/2001 | Kuwahara ................... 715/513 |
| 6,243,711 B1 * | 6/2001 | Wu et al. ................ 707/104.1 |
| 6,282,539 B1 * | 8/2001 | Luca ............................ 707/6 |
| 6,330,659 B1 * | 12/2001 | Poff et al. ..................... 712/34 |
| 6,662,199 B1 * | 12/2003 | Flight et al. ............. 707/104.1 |
| 6,675,161 B1 * | 1/2004 | Suchter ......................... 707/5 |
| 6,785,667 B2 * | 8/2004 | Orbanes et al. ................ 707/1 |

(Continued)

OTHER PUBLICATIONS

Liu, Jiming, et al.; Adaptive Document Segmentation and Geometric Relation Labeling: Algorithms and Experimental Results; 1996; Proceedings of ICPR '96; pp. 763-767.*

(Continued)

*Primary Examiner*—Doug Hutton
*Assistant Examiner*—N Hillery
(74) *Attorney, Agent, or Firm*—Jones Day; Brett Lovejoy

(57) ABSTRACT

Methods, computer systems and computer program products for constructing a presentation in a platform independent manner. A layout is defined that includes a top split. The top split includes a first orientation parameter specifying an orientation for any daughter split created within the top split. A request is received to create a daughter split within the top split. In response, the daughter split is constructed within the top split in accordance with the first orientation parameter. The daughter split includes a second orientation parameter specifying an orientation for any child split created within the daughter split. The layout is converted into the presentation. A database for storing the layout. The database including a layout table having a row for storing an identity of the layout and an identity of the top split in a hierarchy of splits within the layout. The database also including a layoutdata table that has a row for each split in the hierarchy of splits within the layout.

9 Claims, 25 Drawing Sheets

U.S. PATENT DOCUMENTS

| | | | | |
|---|---|---|---|---|
| 6,829,606 | B2* | 12/2004 | Ripley | 707/5 |
| 6,920,457 | B2* | 7/2005 | Pressmar | 707/101 |
| 6,941,302 | B1* | 9/2005 | Suchter | 707/5 |
| 2001/0032254 | A1* | 10/2001 | Hawkins | 709/219 |
| 2002/0116417 | A1* | 8/2002 | Weinberg et al. | 707/517 |
| 2002/0120596 | A1* | 8/2002 | Gershoff et al. | 707/1 |
| 2003/0137539 | A1* | 7/2003 | Dees | 345/762 |
| 2004/0122971 | A1* | 6/2004 | Joshi et al. | 709/236 |
| 2005/0022115 | A1 | 1/2005 | Baumgartner et al. | |
| 2005/0216875 | A1* | 9/2005 | Zhang et al. | 716/9 |
| 2005/0223320 | A1* | 10/2005 | Brintzenhofe et al. | 715/517 |

OTHER PUBLICATIONS

B. Bederson et al. "Ordered and Quantum Treemaps: Making Effective Use of 2D Space to Display Hierarchies", web site ftp.cs.umd.edu/pub/hcil/Reports-Abstracts-Bibliography/2001—18html/2001—18.htm, last accessed May 30, 2003.

L. Bouillion et al. "Model-Based Approaches to Reengineering Web Pages", web site www:citeseer.nj.nec.com/szekely96retrospective. html, last accessed Sep. 9, 2003.

T. Bowden 2002 "Class::DBI", web site www.perl.com/pub/a/2002/11/27/classdbi.html, last accessed Aug. 15, 2003.

G. Grassel, et al. "Definition and prototyping of a Renderer-independent ML", web site www.w3.org/2002/07/DIAT/posn/nokia-ibm-sap-html, last accessed Sep. 9, 2003.

M. Gugliuzza 2002 "Debate—Hand Coding: the Ultimate Freedom" web site www.sitepoint.com/article/968, last accessed Sep. 9, 2003.

T. Lee et al. ""One model and many presentations" in wireless applications" web site www.w3.org/2000/09/Papers/EBTI.html, last accessed Sep. 9, 2003.

T. Lemlouma et al. "Content Adaptation and Generation Principles for Heterogeneous Clients" web site www.w3.org/2002/07/DIAT/posn/inria/DIAT-PositionPaper.html, last accessed Sep. 9, 2003.

R. Lewis "A Device-Independent Method for Web Site Authoring" web site www.w3.org/2002/07/DIAT/posn/volantis/VolantisPosition.html, last accessed Sep. 9, 2003.

K. Pugh 2003 "How to A void Writing Code" web site www.perl.com/pub/a/2003/07/15/nocode.htm, last accessed May 30, 2003.

B. Shneiderman 1998 "Treemaps for space-constrained visualization of hierarchies" web site www.cs.umd.edu/hcil/treemap-history/index/shtml, last accessed May 30, 2003.

K. Vedati "Recommendations for Improving Device Independent Presentation Authoring" web site www.w3.org/2002/02/DIWS/presentations/vedati/vedati.pdf, last accessed Sep. 9, 2003.

C. Wong "*A Single-Authoring Technique for Building Device-Independent Presentations*" web site www.w3.org/2002/07/DIAT/posn/docomo.pdf, last accessed Sep. 9, 2003.

"Class GridBagLayout" web site www.java.sun.com/j2se/1.4.1/docs/api/java/awt/GridBagLayout.html, last accessed May 30, 2003.

"ION . . . search for a graphical usable interface" web site www.modeemi.cs.tut.fi/~tuomov/ion, last accessed May 30, 2003.

"Our Technology Volantis Multi-Channel Server" web site www.volantis.com/volwebsite.jsp?pageName=volmcs, last accessed Sep. 11, 2003.

"Static vs. Dynamic Websites" web site www.anduril.rutgers.edu/wics/lecture/static_dynamic.php, last accessed Sep. 9, 2003.

"Static vs. Dynamic Web Sites" web site www.avidoffice.com/docushare/dsweb/Get/Document-2178/Static+vs+Dynamic+web+content.pdf, last accessed Sep. 9, 2003.

"*W3C Workshop on Device Independent Authoring Techniques*" web site www.w3.org/2002/07/DIAT/final.html, last accessed Sep. 9, 2003.

* cited by examiner

Edit Split Data

Fields shown in bold are required.

Name of New Layout

Reset | Submit

Edit Split Data

Fields shown in bold are required.

Type of New Object ○ Layout ○ Text ○ Gallery ○ Blog

[Reset] [Submit]

Fig. 4I

Edit Split Data

Fields shown in bold are required.

Gallery Width: 2
Gallery Height: 2
Thumbnail Width: 225
Thumbnail Height: 200

[Reset] [Submit]

Author: Ted Z

Posted on Sat Mar 15 23:39:20 2003

Blog title: CAIRO, Egypt (AP) Tens of thousands of anti-war protesters marched in cities around the globe Saturday, some blowing whistles and others firing guns in the air, in renewed efforts to get their voices heard even as war appears more likely. Some called for al-Qaida operatives to attack Israel, others lampooned President Bush as a dangerous cowboy, and yet others burned American flags. The outpouring of pacifist sentiment and widespread criticism of President Bush came a month after millions turned out for some of the biggest demonstrations in decades. But amid chants of "Give peace a chance" in capitals around the world, there were pessimistic voices, as well.

Author: Ted Z

Posted on Sun Mar 16 02:15:17 2003

Tony and Lucy: Today I went to the store and ran into my buddy tony and his girlfriend lucy. they were shopping for water balloons.

Fig. 5 ns and US 7,236,982 B2

COMPUTER SYSTEMS AND METHODS FOR PLATFORM INDEPENDENT PRESENTATION DESIGN

1. FIELD OF THE INVENTION

The field of this invention relates to computer systems and methods for generating a presentation in a language and platform independent manner. A specific implementation of the present invention can be use to generate web pages in a language independent manner.

2. BACKGROUND

Increasingly computer software packages and programming languages have displaced traditional methods of producing images, video, and graphic design layouts. They have also been used to create and maintain web pages on the Internet. A multitude of programming languages and software packages have been created for such purposes. However, these programming languages and software packages are often highly specialized and typically require that the information to be presented be formatted in a specific language. This is especially true for the visual presentation of information on mediums such as Internet web pages.

For anything other than unformatted ASCII text, Internet web pages can typically only be viewed using software packages that are capable of interpreting World Wide Web specific languages such as HTML, Java, and ASP. Similarly, video typically must be streamed over the Internet through programs such as Real Player and QuickTime. Many such World Wide Web specific languages and Internet programs are built upon proprietary code base. Therefore, Internet web pages created using such programs and products can only be seen when specialized software, such as an Internet browser or other form of interpreter, is invoked. All of this leads to the nearly universal requirement that information intended for display on the Internet must be stored in a specific language.

One of the consequences of the Internet language requirement is that content providers that want to present their information across multiple formats typically must store their information in several different ways so that the various types of different devices that the content provider wants to support will be capable of displaying the information. However, storage of the same content in multiple different languages can be time consuming and expensive for content providers. Furthermore, in the rapidly advancing field of Internet web page design and display, it is not always clear if one particular format will be able to reach all of the intended user base or if that format will become obsolete in the future. For example, if a content provider makes a substantial investment in coding web content in ASP and/or HTML, the content provider is at risk if HTML standards or the ASP code changes in the future. If the HTML or ASP standard changes, then the content provider must make an additional substantial investment in time and resources updating all of the content so that it is compatible with the new HTML or ASP standard. Also newer languages can emerge either to support specific devices (e.g. Pocket C for Palm handheld devices), or for more general application (e.g., such as PHP, see www.php.net). Updating content to display in new languages is another expense that must be incurred by content providers.

In many cases, web pages and other visual presentations are coded in such a way that both the information to be displayed and the order of the information to be display are stored in a single file. Everything in such a file is then considered to be static, because nothing else can be inserted into the file or changed, unless the file is opened and altered. Static files that contain all the information for a web page can be generated in three different ways. First, they can be hand coded. Hand coding involves manually writing out lines of code containing the data and instructions on how to order that data. Hand coding is very labor intensive and an unsatisfactory approach for anything other than the simplest web page designs. Second, static files that code for web pages can be generated using a specialized editor. Such specialized editors have the advantage over hand coding in that they can be used to introduce many programming shortcuts, such as the ability to fill in commonly used lines of code on command. Thus, specialized editors are advantageous for hand coding because they speed up the process of web page development. However, specialized editors have two drawbacks. Like hand coding, they require that the user be familiar with the commands of the web specific code (e.g. HTML, Java, etc.). Second, they have the drawback described earlier that web pages produced by such editors are based in a specific web language and are therefore at risk of becoming obsolete when the web language is revised.

The third approach to creating static files that code for web pages is the use of What You See Is What You Get (WYSIWYG) interfaces to generate the web page. Such platforms (e.g., Microsoft Frontpage) use a graphical user interface to allow users to place information onto a canvas using point and click or drag and drop methods. In this approach, specially designed functions are provided in order to arrange items on a page and conduct other tasks. These functions generate code containing the data, its attributes, and the order the data is to be presented so that the user does not need to know how to code in order to create the visual presentation. The code is then saved as a static file as in the hand coding and specialized editor approaches. While the WYSIWYG approach removes the need to train users so that they can program in web specific programming languages, the approach still has the inherent drawback of generating static web files.

The creation of a single static file for each layout of information (e.g., web page) is particularly unsatisfactory in cases where the visual format of the layout is a constant but the information being displayed changes. In such situations, it becomes redundant from a data storage perspective and repetitive from a labor standpoint to create the same static file over and over with only the actual information in the file changing. An examples of such an instances is a multi-page photo gallery where the frames and control functionality is the same on each page and the only thing that changes is the images being displayed.

To address the situation where the overall look of a presentation, such as a collection of web pages, remains the same on each page but the information on each page changes, templates were developed. A template is a standard ordering and layout of information that does not contain the information to be inserted, only a placeholder where each piece of information can be inserted.

To illustrate the advantages of a template, consider the case of a hypothetical online store. The store name appears on the top of each web page associated with the online store. Further, a list of links to each section in the store appears on the left side of the pages associated with the store. A display capable of depicting twelve products, with an order of four products across and three products down, appears in the center of each page associated with the store. A template can be created for such an arrangement, but the template will not contain the product information because such information (the products viewed in the central display) will depend on what section of the store is being displayed. Thus, the template and the data (the products) presented by the template are stored in two different locations. The use of a template in this illustration obviates the need to produce a large number of web pages, each displaying a different sent of products.

The use of templates then splits a presentation (e.g., collection of web pages) into two separate locations, one for the template and one for the data displayed by the template. The template is typically stored as a file and the information that is presented using the template is typically stored in a database. The use of templates is referred to as a dynamic solution because the information inserted into the template can change on a dynamic basis (e.g., as the user selects different sections of the online store or different web pages within the presentation, etc.).

Dynamic approaches to web presentation design eliminates the need to insert information into each and every file associated with the presentation, but it does not remove the dependency on specialized code to order the layout of data in a visual medium such as the Internet. For example, if the goal is to display information in an identical manner on two different platforms, platform specific code must be written for each platform in order to achieve the goal.

Given the above background, what is needed in the art are systems and methods for generating presentations that can be presented on any desired target platform and in any desired target language without modifying the presentation.

Discussion or citation of a reference herein will not be construed as an admission that such reference is prior art to the present invention.

3. SUMMARY OF THE INVENTION

The present invention addresses the problems found in the known art. In the systems and methods of the present invention, presentations are created in a platform independent manner. Thus, they can be presented on any desired target platform using any desired programming language without modification of the platform. Using the systems and methods of the present invention, presentations can be stored, retrieved, and modified in a way that eliminates any dependency on storing the presentation as a combination in a fixed set of code. This is accomplished by a novel combination of a treemap layout algorithm with a generic content engine and a backend storage database to keep all of the components of a web page in the most generic form possible. Language specific modules are then used to convert data, views of data, and the order of data into platform specific code. In this way, presentations can be displayed in more than one programming language or medium, and its data and views of data can be reused more than once in a layout or across multiple layouts.

One embodiment of the present invention provides a method of constructing a presentation in a platform independent manner. A layout that includes a top split is defined. The top split includes a first orientation parameter specifying an orientation for any daughter split created within the top split. A request is received to create a daughter split within the top split. The daughter split is generated within the top split in accordance with the first orientation parameter. The daughter split includes a second orientation parameter specifying an orientation for any child split created within the daughter split. Finally, the layout is converted to the presentation. In some embodiments where the daughter split is a data split, the method further comprises inserting a data object in the data split and associating a view with the data object. This view determines how the data object is presented in the data split. The data object can be a complex object such as a blog or a gallery.

Another embodiment of the present invention provides a computer program product for use in conjunction with a computer system. The computer program product comprising a computer readable storage medium and a computer program mechanism embedded therein. The computer program mechanism is for constructing a presentation in a platform independent manner. The computer program mechanism has instructions for defining a layout that includes a top split. The top split includes a first orientation parameter specifying an orientation for any daughter split created within the top split. The mechanism further has instructions for receiving a request to create a daughter split within the top split and instructions for generating the daughter split within the top split in accordance with the first orientation parameter. The daughter split includes a second orientation parameter specifying an orientation for any child split created within the daughter split. The mechanism further includes instructions for converting the layout to the presentation.

Yet another embodiment of the present invention provides a computer system for constructing a presentation in a platform independent manner. The computer system comprises a central processing unit and a memory, coupled to the central processing unit. The memory stores instructions for defining a layout that includes a top split. The top split includes a first orientation parameter specifying an orientation for any daughter split created within the top split. The memory further stores instructions for receiving a request to create a daughter split within the top split. The memory further includes instructions for generating the daughter split within the top split in accordance with the first orientation parameter. The daughter split includes a second orientation parameter specifying an orientation for any child split created within the daughter split. The memory further includes instructions for converting the layout to the presentation.

Still another aspect of the present invention provides a database for storing a layout comprising a hierarchy of splits. The database comprises a layout table that includes a column for storing an identity of the layout and an identity of the top split in the hierarchy of splits. The database further comprises a layoutdata table that includes a row for each split in the hierarchy of splits, such that each respective split stored in the layoutdata table comprises (i) a parent field that specifies the parent split of the respective split, and (ii) a type field that specifies whether the respective split is a data split and, when the respective split is not a data split, defines an orientation of the respective split within the parent split of the respective split.

4. BRIEF DESCRIPTION OF THE DRAWINGS

FIG. 5 illustrates a portion of a blog in accordance with an embodiment of the present invention.

Like reference numerals refer to corresponding parts throughout the several views of the drawings.

5. DETAILED DESCRIPTION

Figure 1:
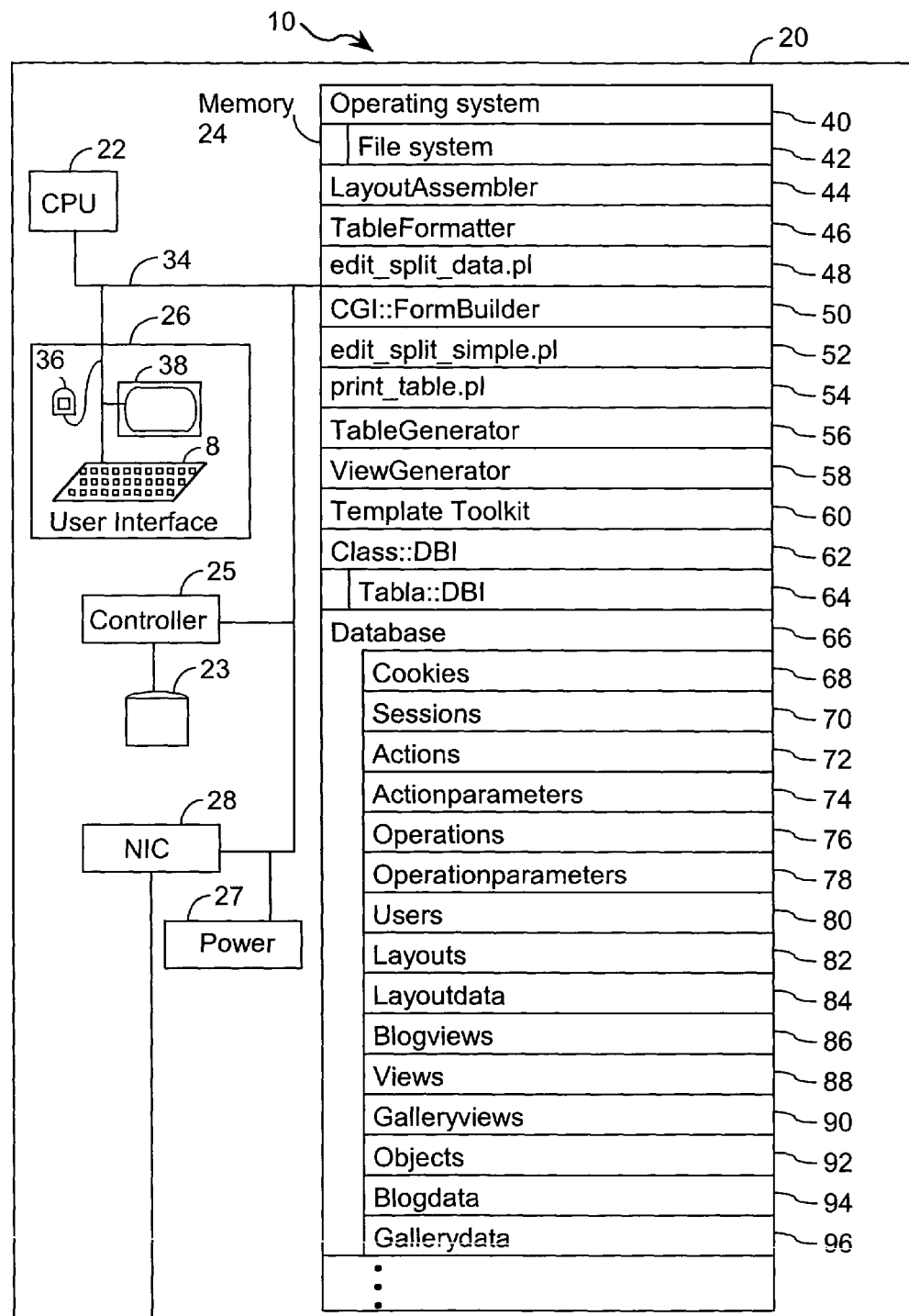
FIG. 1 illustrates a computer system for generating a presentation in a language and platform independent manner in accordance with one embodiment of the present invention.

Referring to FIG. 1 a specific embodiment of a system 10 in accordance with one aspect of the invention is illustrated. System 10 preferably comprises a server 20 that includes:

- a central processing unit 22;
- a main non-volatile storage unit 23, preferably including one or more hard disk drives, for storing software and data, the storage unit 23 typically controlled by disk controller 25;
- a system memory 24, preferably high speed random-access memory (RAM), for storing system control programs, data, and application programs, including programs and data loaded from non-volatile storage unit 23; system memory 24 can also include read-only memory (ROM);
- an optional user interface 26, including one or more input devices, such as a mouse, a keypad 8, and display 38 and/or mouse 36;
- network interface circuitry 28 for connecting to any wired or wireless communication network, the network interface circuitry 28;
- one or more internal buses 34 for interconnecting the aforementioned elements of the system; and
- a power source 27 for providing power to the above identified components.

Operation of server 20 is controlled primarily by operating system 40, which is executed by central processing unit 22. Operating system 40 can be stored in system memory 24. In addition to operating system 40, a typical implementation of system memory 24 includes a file system 42 for controlling access to the various files and data structures used by the present invention.

Database 66 is any form of data storage system including, but not limited to, a flat file, a relational database (SQL), and an OLAP database (MDX and/or variants thereof). In some specific embodiments, database 66 is a hierarchical OLAP cube. In preferred embodiments, database 66 is implemented as a RDBMS server, an objected-oriented database, or a file-based RDBMS server. In one embodiment, database 66 is implemented as a MySQL database (MySQL AB, http://www.mysql.com). In some embodiments, there is only a single database 66 while, in other embodiments, there are a plurality of databases 66. In some embodiments of the present invention, system 10 includes a plurality of servers 20. The servers 20 can be in one centralized location. However, more preferably, the servers 20 are distributed over a large geographic area. It will be appreciated that the software modules illustrated in memory 24 are listed in memory 24 for ease of presentation. In fact, any of the software modules and database 66 illustrated in memory 24 of FIG. 1 can be independently located in any memory that is addressable by system 20 including, but not limited to, remote servers.

The present invention provides a database-driven architecture that stores platform and language independent layout instructions in a database 66. A layout is a visual presentation of information, such as a web page. Modules 44 through 64, described in more detail below, allow a user to build, edit, and review these layouts. Each layout comprises a series of instructions that are hereinafter referred to as splits to emphasize that they do not encode absolute screen positions, but rather specify subdivisions in the layout. Because the splits do not encode absolute screen positions, they are suitable for any display device, from basic HTML rendered on a browser to Java Swing containers.

Each split in a layout can contain one or more splits or an object view. An object view is a description of how an object associated with the object view is to be displayed. Advantageously, the layout data, including splits, object views and objects, are stored in database 66. Further, all operations performed by a user are stored in the database. When an operation is executed, its implementation is referred to as an action. For instance, an implementation (action) for the operation "modify a text object" is "modify text object 234 to say 'hello'". All actions are stored in database 66 so that the path a user took to create a layout's current state can be recreated for various purposes. In addition, operations can be batched into macros so that complex tasks (e.g., creating a layout) can be expressed in a single action (e.g., as a macro).

The various advantages and features of the present invention will be presented by first describing the major components of a database 66 schema (FIG. 2) in accordance with a preferred embodiment of the present invention (Section 5.1). Then, the process steps (FIG. 3) taken by a user to edit or view a layout will be presented (Section 5.2). Next, a collection of exemplary screen shots showing the construction of a layout in accordance with one embodiment of the present invention (FIG. 4) will be described (Section 5.3). Section 5.4 provides a detailed example of how an operation on a complex object (a gallery view) is processed and stored in database 66.

5.1. Exemplary Database Schema

Figure 2:
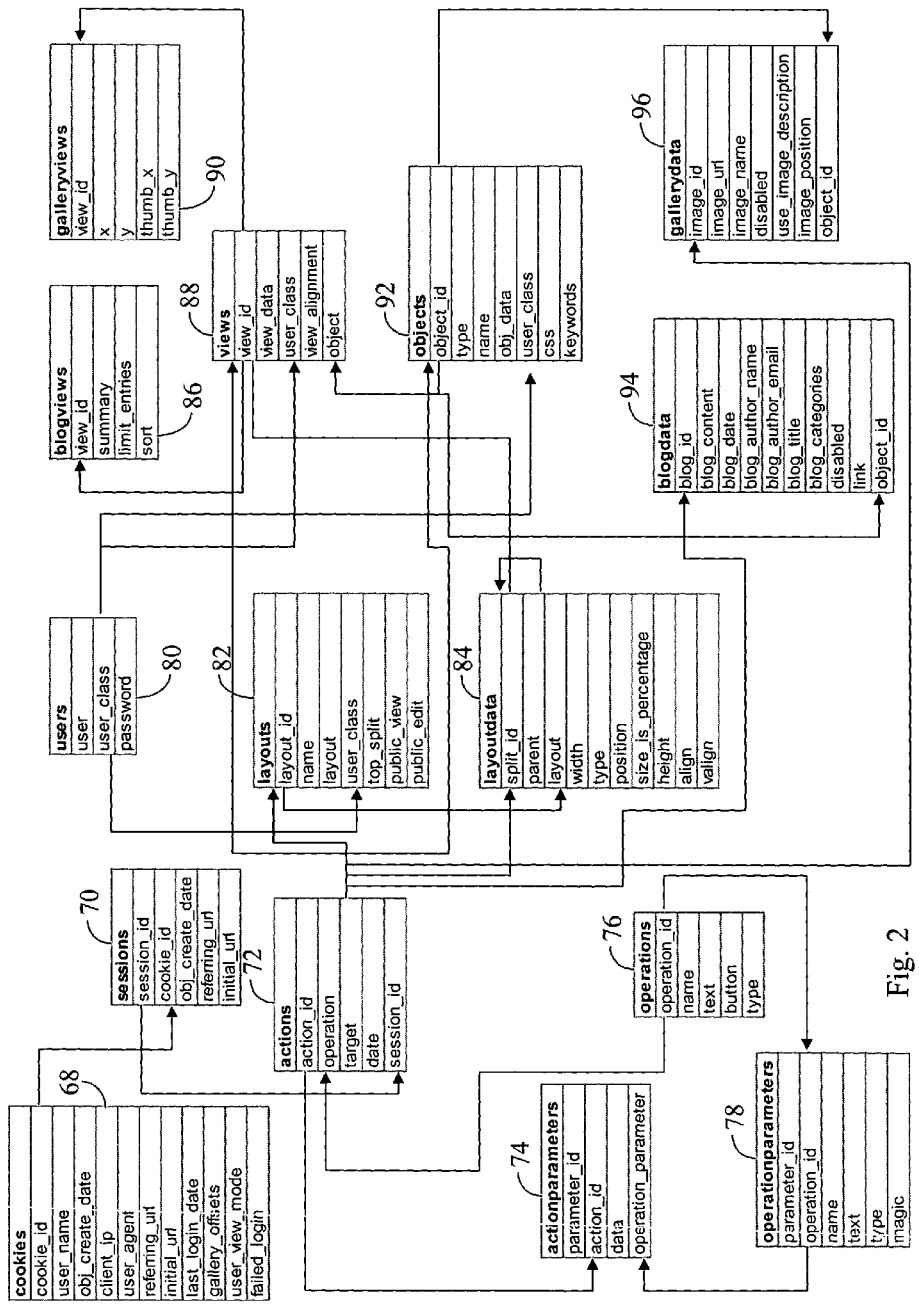
FIG. 2 illustrates a database schema for storing presentations in a language and platform independent manner in accordance with one embodiment of the present invention.
Figure 3A:
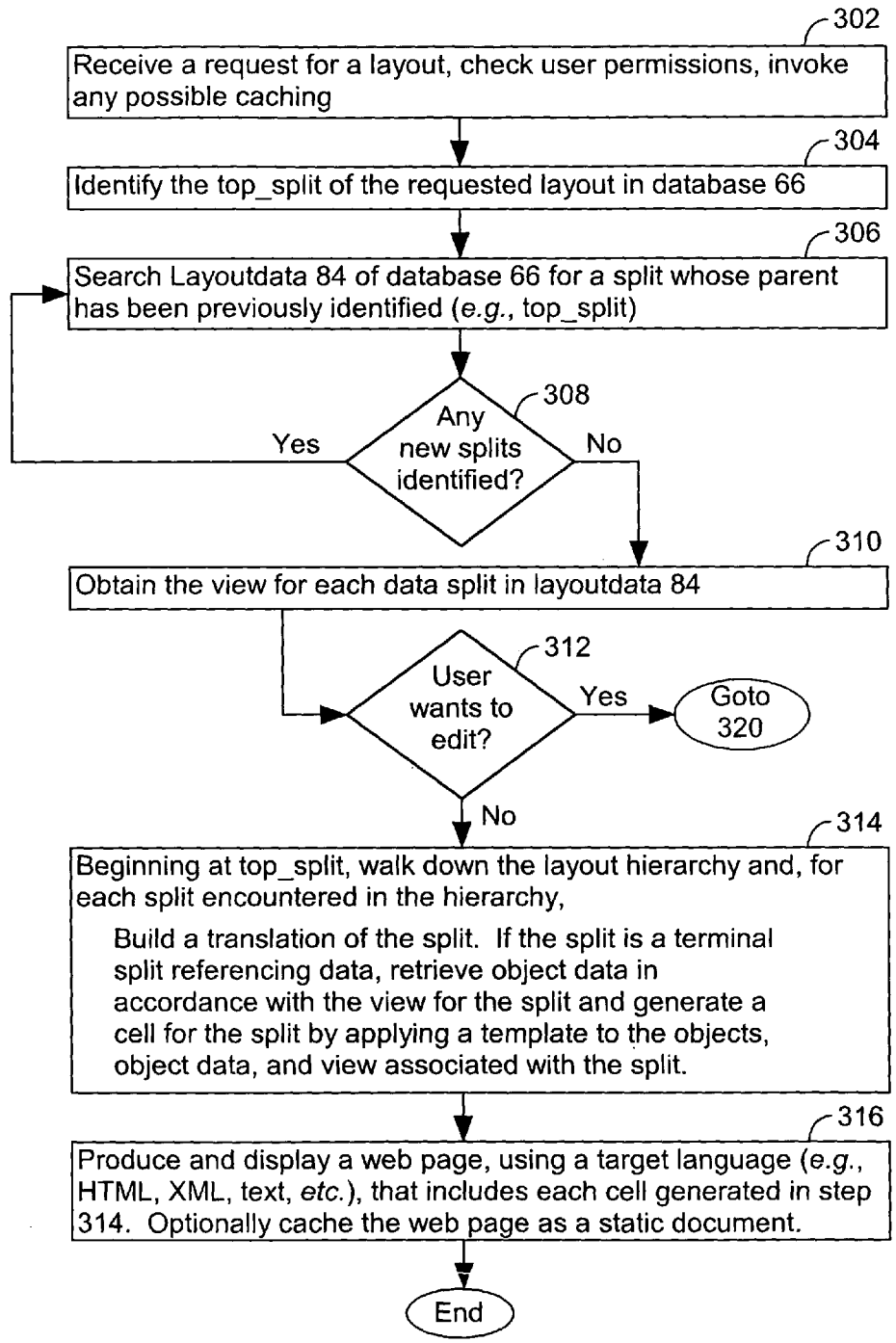
FIGS. 3A-3B illustrate procedures for retrieving and editing a presentation in accordance with one embodiment of the present invention.

Database 66 (FIG. 1) illustrates the tables found in a database schema in accordance with one embodiment of the present invention. The columns of the database tables illustrated in FIG. 1 and the relationship between the various database tables are illustrated in FIG. 2. In FIG. 2, a "one to one" relationship between tables is illustrated as a straight line to straight line, a "one to many" relationship between tables is illustrated as a straight line to an arrow, and a "many to many" relationship between tables is illustrated as an arrow to an arrow.

Cookies 68 tracks user information such as IP addresses, user agent, user name, and the uniform resource location (URL) that referred the user to the site. Cookie table 68 is primarily a tracking and debugging table.

Session table 70 tracks session information for users. Section table 70 tracks the date of a session, the first URL viewed in that session, and the URL that referred the user to the site of that session. The cookie_id column in session table 70 is a foreign key to cookies table 68. Session table 70 is primarily a tracking and debugging table.

Actions table 72 stores user invoked operations that create or edit layouts, splits, object views, or objects as actions. The operation column of action table 72 indicates the type of action the user has taken. The target column of action table 72 indicates the layout (layout_id), split (split_id), object view (view_id), or object (object_id) that the action is being committed upon.

Actionparameters table 74 stores any values associated with an action. Not all actions have a parameter. However, some actions have one or more parameters. An action that creates a blog entry, for instance, will have one parameter for the title of the blog and another one for the actual content in the entry. The column operation_parameter in the actionparameters table 74 is a foreign key to the operationparameters table 78, described in more detail below.

Operations table 76 is a lookup table that includes information for all possible types of actions. Operationparameters table 78 contains additional information about operations. For instance, a single operation may need to alter more than one database table or column. Operationparameters table 78 provides additional information necessary to apply each step in the operation including Perl code to be enacted by the magic column. Actionparameters table 74 has a foreign key to this table so that system instructions for each action parameter can be obtained. A detailed example of the use of actions table 72, operations table 76, actionparameters table 74 and operationparameters table 78 work to process an operation is provided in Section 5.4 in conjunction with FIG. 4P.

Users table 80 contains the login and password for each user. It also contains a user class value that governs what information each user can alter and view in database 66.

Layout table 82 contains information about each layout stored in database 66. A layout represents the complete collection of information for a specific presentation. For each layout stored in database 66, layout table 82 dictates who can view and edit each layout through values stored in columns user_class, public_view, and public_edit. Specifically, the user_class column identifies the user class that has full access (read and write privileges) to the layout. The public_view and public_edit columns respectively specify whether visitors with a user class different from the layout's user class can view and edit the layout. Each layout is assigned a unique layout ID that is stored in the layout_id column of layout table 82. The user assigns a name to each layout and this name is stored in the name column of layout table 82 The top_split column specifies the top split of each layout stored in database 66. The top split is the first layout instruction that is executed during a layout read procedure. Layouts have a hierarchical data structure such that the top split serves as the starting point from which all information concerning a particular layout is retrieved from database 66. The top_split column of the layout table is a foreign key to layoutdata table 84.

Layoutdata table 84 stores all the splits of all the layouts stored in database 66. The parent column of layoutdata table 84 indicates the parent split that a given split falls under. If the split is a top_split, then in the layouts table the value for the split in the parent column is null. Layoutdata table 84 also includes several property columns that determine attributes of the split such as position relative to the other daughter splits sharing a parent, height, width, and alignment. However, no column in the layoutdata table 84 dictates the absolute position of a split in a given display. This is one of the advantages of the data architecture of the present invention. As will be explained in more detail below, a treemap algorithm is applied to successive splits in the layout hierarchy in order to determine the absolute position of each split in the layout. Usage of the treemap algorithm in this novel way removes any requirement for hard coding splits and allows for the development of code independent and platform independent presentations. The type column in layoutdata table 84 determines whether a given split is directional with respect to the parent split (e.g., horizontal or vertical) or if the split is a data split. In some embodiments the type column specifies that the splits are to be arranged in a circle or a rectangle. In fact, in some embodiments, the type column specifies any arrangement of items based on position.

Objects are stored in object table 92. Each object is assigned an object_id that is stored in the object_id row of object table 92. Additionally, each object is given a user defined name that is stored in the name row of object table 92, a user class who can edit the data that is stored in the user_class row of object table 92, and the type of data the object contains that is stored in the type row of object table 92.

Blogdata table 94 tracks a special form of object called a blog. Blog objects are complex objects and therefore require database table 94 in addition to database table 92 to store all their data. The term "blog" is a form of "web-based diary". A blog object is considered complex because it contains a series of time stamped entries that are entered by users who have read/write privileges to the blog.

FIG. 5 illustrates a portion of a blog with two time stamped entries 520. Each blog entry 520 is stamped with the date 522 in that it was created. Further, the author 524 of each blog entry 520 is noted in the entry. Although not shown, each blog optionally has a blog title and a category that is stored in blogdata table 94.

Each of the time-stamped entries in a blog can be considered a separate object. However, each entry in a given blog is assigned the same object_id and this object_id is stored in the object_id column of object table 92. The name of the blog is stored in the name column of object table 92. There is a one to many relationship between a blog, stored in object table 92, and the blog entries for the blog, stored in blogdata table 94. That is, each blog entry in a blog is stored in a separate row in blogdata table 94.

Each blog entry in blogdata table 94 has a title that is stored in the blog_title column of blogdata table 94. Each blog entry is given a unique identifier that is stored in the blod_id column of blogdata table 94. The content of a blog entry is stored in the blog_content column of blogdata table 94. The date of a blog entry is stored in the blog_date column of blogdata table 94. Further, the blog entry author's name and e-mail address are respectively stored in the blog_author_name, and blog_author_email columns of blogdata table 94. The disabled column of the blogdata table 94 tracks whether the blog has been disabled. The link column of the blogdata table 94 provides a link, such as a link to a picture gallery described in more detail below, that provides a means for linking an object to a given blog entry.

Like blogs, gallery objects are complex objects meaning that they need a separate database table, in addition to object table 92, to store all their data. This separate database table is gallerydata table 96. An exemplary gallery is gallery 502 of FIG. 4T. The obj_data column of object table 92 contains the object gallery title. Each gallery entry 504 is stored as a row in gallerydata table 96. As such, there is a one to many relationship between a gallery object, stored in object table 92, and the gallery entries, which are stored each independently stored as rows in gallerydata table 96.

Each gallery entry 504 in a gallery 502 (FIG. 4T) has the same object identifier (object_id). Further, each gallery entry 504 is assigned a unique image identifier, which is stored in the image_id column of the gallerydata table 96. Each gallery entry 504 is stored at a particular URL address that is stored in the image_url column of the gallerydata table 96. Each gallery entry 492 is also assigned an image name that is stored in the image_name column of the gallerydata table 96. Each gallery entry 504 has a flag to indicate whether or not the image is disabled. This flag is stored in the disabled column of gallerydata table 96.

As seen in the case of blogs and galleries, objects can be complex. The database schema illustrated in FIG. 2 illustrates two types of complex objects, blogs and galleries. However, the present invention is not limited to such data forms. Those of skill in the art will appreciate that many other types of complex objects can be constructed in view of the teachings of the present invention and all such complex objects are within the scope of the present invention.

Objects are pure data that contain little if any information on how the objects are to be displayed in a presentation. Such presentation information is stored in object views. In other words, a view controls how a corresponding object looks in a presentation. Views have two important properties. First, there can be more than one view per object. This allows the same set of data to be displayed with different properties in more than one layout. An example of an instance where there is more than one view for an object is the case of a photo gallery that has 75 by 75 pixel thumbnails when used as a minor item within a layout, and has 150 by 150 pixel thumbnails when used as a major item in a different layout. Second, in preferred embodiments, there is only one view per data split.

Views are stored in the views database table 88. There are also special views for certain objects. For instance, there are blog views and gallery views that respectively handle the particular attributes of blog objects and gallery objects. Blog views and gallery views are respectively stored in blogviews table 86 and galleryviews table 90.

Each row of view table 88 has an object field that identifies the object to which the view applies. Further, each view has a view identifier that is stored in the view_id column of view table 88. There is a one to one correspondence between the view identifier of a view and the split identifier of the corresponding split that holds the object regulated by a particular view. In other words the view_id of views table 88 is exactly equal to the split_id of the data split in layoutdata table 84 that contains this view. When an object is added to a split in a layout, a view is created in order to regulate how the object appears in the split. Each view has a user class field, which is stored in the user_class field of view table 88, that identifies the user class that has full access to the view.

Blogviews, stored in blogviews table 86, includes a view_id column that is keyed to the view_id column of the corresponding view in view table 88. Each blogview includes a summary field that specifies the number of words that a presentation should use to summarize blog entries in the summary view of the blog. Further, there is a "limit entries" field that specifies the maximum number of entries to display in a blog at any given time. Further, a blogview includes a sort field that determines whether the blog entries should be sorted (e.g., by date, etc.).

The gallery views, stored in galleryiews table 90, have a view identifier field that is stored in the view_id column. The view_id of each respective galleryview in table 90 is identical to the view_id of the view in views table 88 that corresponds to the respective galleryview. Each galleryview has x and y dimensions that respectively specify the number of images to be displayed on a row and the number of rows to be displayed. For example, if x, y is 3, 2, two rows of images are displayed, with three images on each row. If the gallery has more than six images in the case where x, y is 3, 2, then remainder of the images are not presented in the galleryview but can be used, for example, as a separate gallery page. The thumb_x and thumb_y columns in a galleryview specify the thumbnail size of each image used in the gallery.

In some embodiments of the present invention, database 66 is written to and read from using Class::DBI 62 (FIG. 1), which is available from the Comprehensive Perl Archive Network (CPAN) at http://www.cpan.org/index.html. Class-::DBI 62 is a Perl class that works on the basis that each table in a database has a corresponding class. Perl is a cross platform programming language. See, for example, Schartz and Pheonix, *Learning Perl*, O'Reilly & Associates, 3rd edition, 2001, which is hereby incorporated by reference in its entirety. In some embodiments, database 66 is a MySQL database. The advantage of using Class::DBI 62 is that information can be written to and read from database 66 without writing any customized SQL code. However, Class::DBI 62 is merely one example of how the systems and methods of the present invention can be constructed and do not serve to limit the invention in any way. Any form of database architecture can be used in the present invention, including a flat file. Furthermore, such databases can be updated using any form of database language, including SQL.

As illustrated in FIG. 1, some embodiments of the present invention provide class Tabla::DBI 64 that inherits from Class:DBI (available form CPAN). In such embodiments, the various modules described in Table 1 inherit from Tabla::DBI in order to interact with corresponding database tables present in database 66:

TABLE 1

Tabla::DBI modules

| Module | Function |
| --- | --- |
| Tabla::DBI::Action | User actions |
| Tabla::DBI::ActionParameter | Action parameters |
| Tabla::DBI::Configuration | Site configuration parameters |
| Tabla::DBI::Cookie | User cookie management |
| Tabla::DBI::Layout | Layouts |
| Tabla::DBI::Object | Objects |
| Tabla::DBI::Operation | Operations |
| Tabla::DBI::OperationParameter | Operation parameters |
| Tabla::DBI::Session | User session management |
| Tabla::DBI::Split | Splits |
| Tabla::DBI::User | Users |
| Tabla::DBI::View | Views |
| Tabla::DBI::Data::Gallery | Gallery data (images) |
| Tabla::DBI::Data::Blog | Blog data (blog entries) |
| Tabla::DBI::View::Gallery | Gallery views |
| Tabla::DBI::View::Blog | Blog views |

5.2. Exemplary Layout Viewing and Editing

The architecture of a database 66 in accordance with one embodiment of the present invention has been described. What follows is a description of how such a database 66 is used to create a presentation in a platform and language independent manner. All information is entered by a user through a series of actions that perform operations. Operations are logical units of work done to a layout and any of the sub-groupings contained within a layout. Performing an action will alter one of the database 66 tables by either inserting a new row or updating an existing row. For instance creating a new split inside a layout results in the insertion of a new row in the layoutdata table. In some embodiments, all of the user directed interaction with database 66 takes place through a web based GUI. However, more generally, users can create and edit information through any type of GUI that can access and modify database 66.

In addition to altering database 66 when an action is committed, the operation performed and the action committed can be recorded in the actionparameters 74 table of database 66. Recording every action and operation a user performs on the system allows for the ability to undo or redo actions performed so that users can correct mistakes made or try variations on their design by clicking buttons to undo or redo actions. Further, this feature allows for the creation of macros. A macro is a sequence of commonly used actions specified by a user.

Step 302. In step 302 (FIG. 3), a request is received for a layout stored in database 66. A check is performed to determine whether the user making the request has the appropriate permission to make such a request. In some embodiments of the invention, this is accomplished by a table lookup to user table 80 to see if the requesting user is in a user class that has read/write privileges for the requested layout.

In some embodiments, the layout collection is requested by the print table.pl script 54 (FIG. 1) which, in turn, invokes various software modules in order to assemble a full presentation of a layout. Print_table.pl 54 also checks user permissions and does caching. Caching is used to cache presentations when they are generated. In this way, the presentation does not have to be regenerated in cases where the presentation has not been altered since the last time the presentation was requested.

In some embodiments print_table.pl 54 authenticates a user with HTTP browser cookies. In some embodiments, user options and a user session are tracked in two separate cookies using the Tabla::DBI::Cookie, Tabla::DBI::Session, and Tabla::DBI::User modules. In some embodiments, when a layout has not changed since the last time it was viewed, a cached version of the visual representation of the layout is retrieved from memory 24 or disk 23. When the layout has not changed since the last time it was viewed it is stored in a cache (not shown) once it has been generated.

Step 304. A layout is displayed starting with its top split. In step 304, layout table 82 is searched for the identity of the top split that corresponds to the layout requested by the user.

Steps 306 and 308. Once the top split for a requested layout has been identified, the layoutdata table 84 (FIG. 2) is searched for splits whose parent is the top split. In practice, this search involves identifying every split in table 84 whose "parent" identifier is the same as the "top_split" identifier in the requested layout. In step 308, a determination is made as to whether any new splits were identified in the layoutdata table 84 during the last instance of step 306. If so (308-Yes), then a new query of the layoutdata table 84 is made. In the new query, any split whose parent identifier is the same as the split_id of a split identified in a previous instance of step 306 is selected. To illustrate, consider the case in which the top_split identifier for a requested split is 1001. In step 306, a search is made for all splits whose parent identifier equals 1001 and two such split are found. The two splits that are found have split identifiers (split_ids) 1018 and 1021, respectively. Split 1018 and 1021 each designate split 1001 as the parent identified (parent). In step 308, a determination is made that new splits have been found in the last instance of step 306 (splits 1018 and 1021) (308-Yes). Therefore step 306 is reinvoked to identify any split having a parent id of 1018 or 1021 (1001 has already been searched). If no new splits are found (308-No) process control passes on to step 310. Steps 306 and 308 collect all the split in a layout in this iterative manner because the splits in a layout are arranged in a hierarchical manner, as determined by a treemap algorithm, discussed in more detail below.

When steps 306 and 308 have completed, there is a hierarchy of splits collected. There are two types of splits. The first type of split defines a branch in the hierarchy and contains no data. The second type of split terminates a branch of the hierarchy and either includes data or is empty. An empty terminal split is a container without content. As such, the only place in the layout that objects can be stored is in terminal splits that include data. The splits collected in step 306 need not be arranged in their proper hierarchical order at this stage. This hierarchical order only has significance when a presentation based on the layout is to be displayed.

Step 310. Once the layout hierarchy is collected, the view for each terminal split that has a corresponding view is retrieved. This is accomplished by searching views table 88 for the view having a view_id that matches or otherwise corresponds to the terminal split's split_id. Each view references an object through the object column of views table 88 of database 66. These referenced objects are collected at a later stage from object table 92.

In some embodiments, print_table.pl 54 invokes LayoutAssembler 44 to collect all the splits and views in a requested layout. LayoutAssembler 44 is a convenience wrapper around the Tabla::DBI functionality. Data collection is made possible because the Class::DBI auto-retrieve functionality in the Tabla::DBI::Layout, Tabla::DBI::Split, Tabla::DBI::View, and Tabla::DBI::Object modules described in Table 1, above, is used to define the relationships between splits, objects, and views in a given layout. Thus, in such embodiments, the order of collection flows logically from these relationships. For example, only once the view associated with a data split has been collected can Class::DBI retreive the objects associated with that view. After the layout is collected, the layout tree is stored in memory (e.g., memory 24 and/or 23) as a Tabla::DBI::Layout object that inherits from Class::DBI.

Step 312. In step 312, a determination is made as to whether want to edit the layout. If so, (312-Yes) control passes to step 322, which is described in more detail below. If not, (312-No) control passes to step 314.

Step 314. Step 314 is reached in the case where the user has requested to view a layout but does not wish to edit the layout. In step 314, TableGenerator 56 is invoked to walk down the layout hierarchy of the requested layout in order to build a translation that represents the layout. In typical embodiments, the translation is a set of nested tables. As an example of this process, a horizontal split that has two members is expressed as a table with one column and two rows. The split view parameters (from layoutdata table 84) such as width and height are applied to the table that holds the split but not to the cells inside the table. If one of the two members has a split (a daughter split), a table corresponding to this daughter split, is nested within the cell of the respective member. This process of nesting tables within the cells of the tables of parent splits continues until all the splits in the layout are represented. This form of table representation is referred to herein as a treemap representation.

When a terminal split in the layout that references one or more objects through a corresponding view is encountered, TableGenerator 56 invokes ViewGenerator module 58 to retrieve the objects referenced by the view. ViewGenerator module 58 uses the retrieved objects to build a cell for the terminal split. This cell, in turn, is positioned within the table that hosts the terminal split. ViewGenerator module 58 retrieves objects by using the object identifier field in the view (of views table 88) associated with the terminal split to identify objects from object table 92. In cases where the object is a complex object (e.g., a blog or gallerydata) the view associated with the complex object is used to determine what components of the object are collected. For example, in the case where a gallery view specifies a two by three matrix of images, only the first six referenced images are collected regardless of how many images are available for the complex object.

In some embodiments ViewGenerator module 58 generates a cell from object data by a applying a template from Template Toolkit 60 to the object, object data and the view. Template toolkit 60 is a public domain template processing system written in Perl with certain elements coded in the C programming language to enhance speed. The template toolkit is capable of creating static and dynamic web content and incorporates various modules and tools to simplify this process. It is available from www.template-toolkit.org.

Step 316. In step 316 a web page (presentation) that includes the translation generated in step 314 is displayed. The modules used to generate the translation in step 314 determine what language the web page is written in (e.g., HTML, XML, text, etc.). The exemplary ViewGenerator module 58 and the Template toolkit 60, described above, are specific implementations that generate translations written in HTML. However, any presentation language of interest (XML, text, etc.) can be used to make a presentation (translation) from the layout tree. Furthermore, the presentation language does not have to support tables or graphics. For instance, in text, the nested tables can be drawn with the symbols "/–\" and images in image galleries can be simply shown as URLs. The particulars of the presentation language, therefore, dictate the view of the layout and the view of the individual objects, but the format of the layout tree remains unaltered regardless of the nature of the target presentation language.

Step 322. Step 322 is reached in the case where the user has requested to view a layout but and wishes to edit the layout. In step 322, TableGenerator 56 is invoked to walk down the layout hierarchy of the requested layout in order to build a translation that represents the layout in the manner described in step 314, above.

Step 324. In step 324, a menu of edit options is associated with each object, view and split in the layout. The menu options in each menu is dependent upon the characteristics of the object, view, or split to which the menu is associated. FIG. 4M provides an illustration of such menus. In FIG. 4M, menus are attached to each object, view and split within a given layout. For example, menu 430 is associated with split 428. Furthermore, the options available in each respective menu is dependent upon whether the respective menu is associated with an object, view or split. The options available in each menu are further dependent upon the nature of the these objects, views and splits. For example, if the options available for a blog will differ from the options available for a gallery.

In some embodiments TableFormatter module 46 (FIG. 1) is used to associate menu options with editable portions of the requested layout. For every respective object, view or split in the requested layout, TableFormatter module 46 requests a list of operations that can be performed on the respective object, view, or split. In one embodiment of the present invention, this request is serviced by Tabla::DBI::Operation module (Table 1). For an object, the Tabla::DBI::Operation module uses the Tabla::DBI::Object module (Table 1) to understand the nature of the object (e.g., whether it is a simple object or a complex object). For a split (or view), the Tabla::DBI::Operation module uses the Tabla::DBI::Split module (Table 1) to understand the nature of the split as well as the views within the split.

For each respective object, view, or split in a layout, Tabla::DBI::Operation returns to TableFormatter module 46 a list of operations that can be performed on the respective object, view, or split. In a preferred embodiment, each of these operations is encoded as a URL. Each returned operation specifies the appropriate editor that is to be used to perform the operation on the associated object, view, or split. The types of editors available in one embodiment of the invention are described in more detail below. Further, operations can include parameters that provide information such as the appropriate layout name, the target ID, and the operation ID for the object, view, or split. In some embodiments of the invention, Template Toolkit 60 is used to associate the operations as menu options next to the particular object, view, or split to which they are associated.

Step 326. In step 326 a web page (presentation) of the translation generated in step 322 and appended to in step 324 is displayed using procedures and modules that are the same as or similar to those described in step 316, above. However, in a preferred embodiment the web page provides simplified versions of the objects, views, and splits in the translation rather than the full version created in step 316. The purpose of the simplified version of the web page is to provide a working template of the presentation that can be edited and modified as described in subsequent steps below.

Step 328. In step 328, a menu selection designating an operation associated with an object, view or split within a given layout is received.

Step 330. In step 330, a determination is made as to whether the operation designated in step 328 has parameters (330-Yes) or is a simple parameterless operation (330-No). If the operation designated in step 328 has parameters (330-Yes), control passes to step 332. Otherwise (330-No), control passes directly to step 334.

Step 332. If the operation designated in step 328 has parameters, the edit_split_data.pl 48 (FIG. 1) editor is invoked. The edit_split_data.pl 48 editor is a Perl script that uses the CGI::FormBuilder module 50 to build an HTML form that can be filled in or edited by a user. CGI::FormBuilder module 50 is a Perl module that is designed to generate and process CGI form-based applications. It is available from www.formbuilder.org. Thus, in step 332, a form that includes the parameters associated with the designated option are presented to the user. When the user has finished editing the form, it is submitted.

Step 334. In the case where step 332 was not invoked for a given requested operation, no form page is generated when because the requested operation does not have parameters. The edit_split_simple.pl module 52 is invoked to process parameterless operations.

In the case where step 332 was invoked, the results of the form submission from step 332 are used by edit_split_data.pl module 48 to create a Tabla::DBI::Action object. In other words, edit_split_data.pl module 48 creates an entry (a row) corresponding to the form submission in the actions table 72 (FIG. 1). In the case where step 332 was not invoked, the edit_split_simple.pl module 52 is used to create the Tabla::DBI::Action object.

Regardless of whether edit_split_data.pl module 48 or edit_split_simple.pl module 52 is used, the newly created Tabla::DBI::Action object is assigned a unique action_id value that is stored in the action_id column of actions table 72. The newly created action is also given a target. In some embodiments, the target is passed down to edit_split_data.pl module 48 (or edit_split_simple.pl module 52) in the "target" CGI parameter, embedded in the URL link by Table-Formatter module 46. The target is the identifier for the object (object_id), view (view_id), or split (split_id) that the action operates on. A reference to the operation requested (e.g., edit, delete, add, etc.) is also stored in the newly created action in the operation column of actions table 72.

In the case where the operation includes parameters, the edit_split_data.pl module 48 stores each parameter as a row in the actionparameters table 74 and each parameter receives a unique parameter_id that is stored in the parameter_id column of actionparameters table 74. The parameters stored in the actionparameters table 74 for a given action are joined to the action based upon the action_id value.

Step 336. After an action has been stored in database 66, the layout is modified in accordance with the newly stored action. In some embodiments, this is accomplished by the do_action( ) routine of the Tabla::DBI::Action module. After the action is processed and the layout modified, process control passes to step 304 where the layout is recollected and represented to the user in order to reflect the changes made to the layout.

5.3. Exemplary Construction of a Layout

Figure 3B:
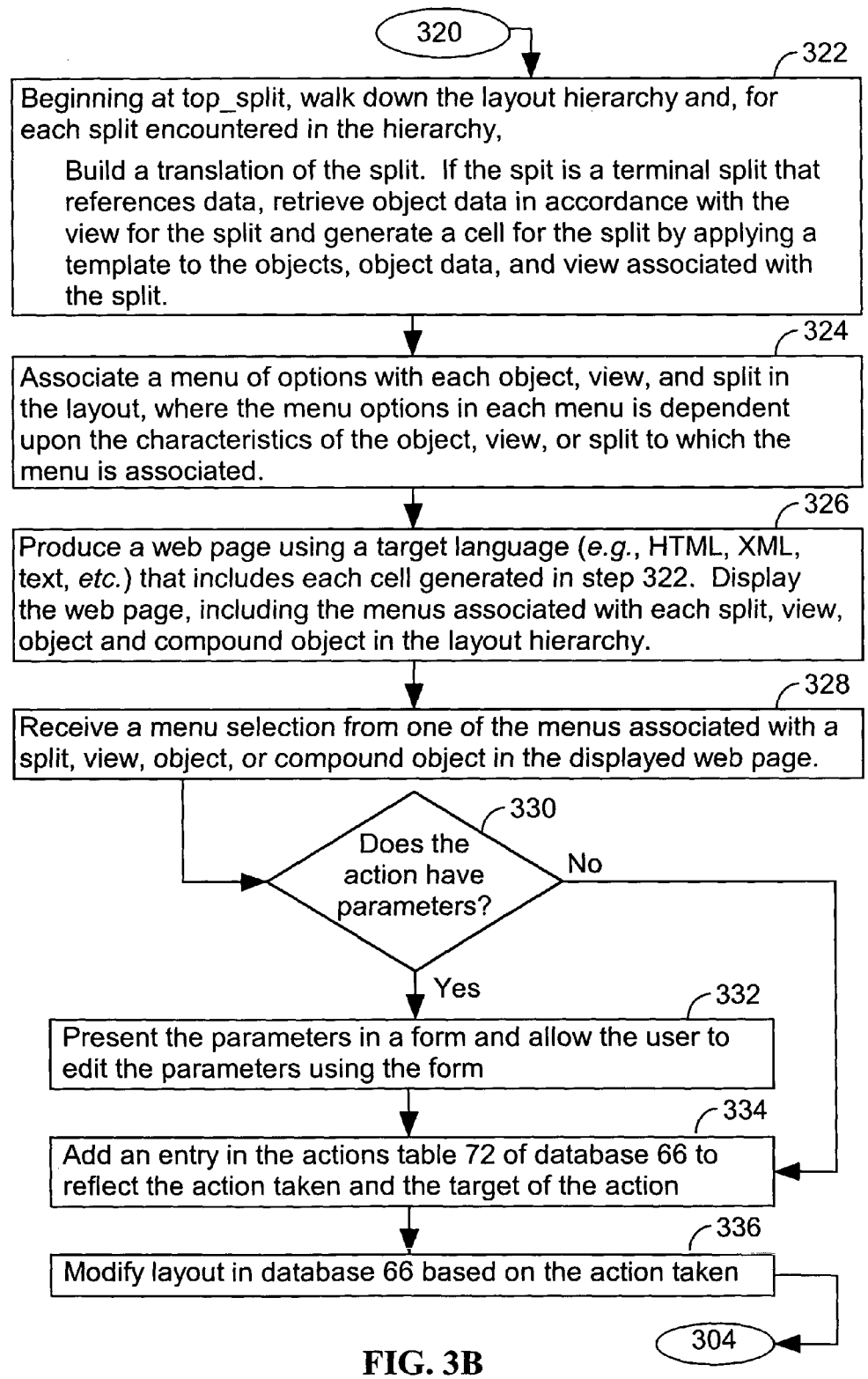

Methods for viewing and editing layouts in accordance with one embodiment of the invention have been described with reference to FIG. 3. FIG. 4 illustrates the construction of layout using such methods.

To create a new layout, a user provides a name for the layout. FIG. 4A illustrates a form in which the user provides a name for a new layout that they wish to create. Submission of form 402 triggers an action that is stored in actions table 72 of database 66 (FIG. 2). When the action is executed (e.g., by the do_action( ) routine of the Tabla::DBI::Action module), a new row is added to layouts table 82 for the new layout. In addition to creating a row in layouts table 82 of database 66, a row is also inserted into layoutdata table 84 to represent the top split in the newly created layout.

Figure 4B:
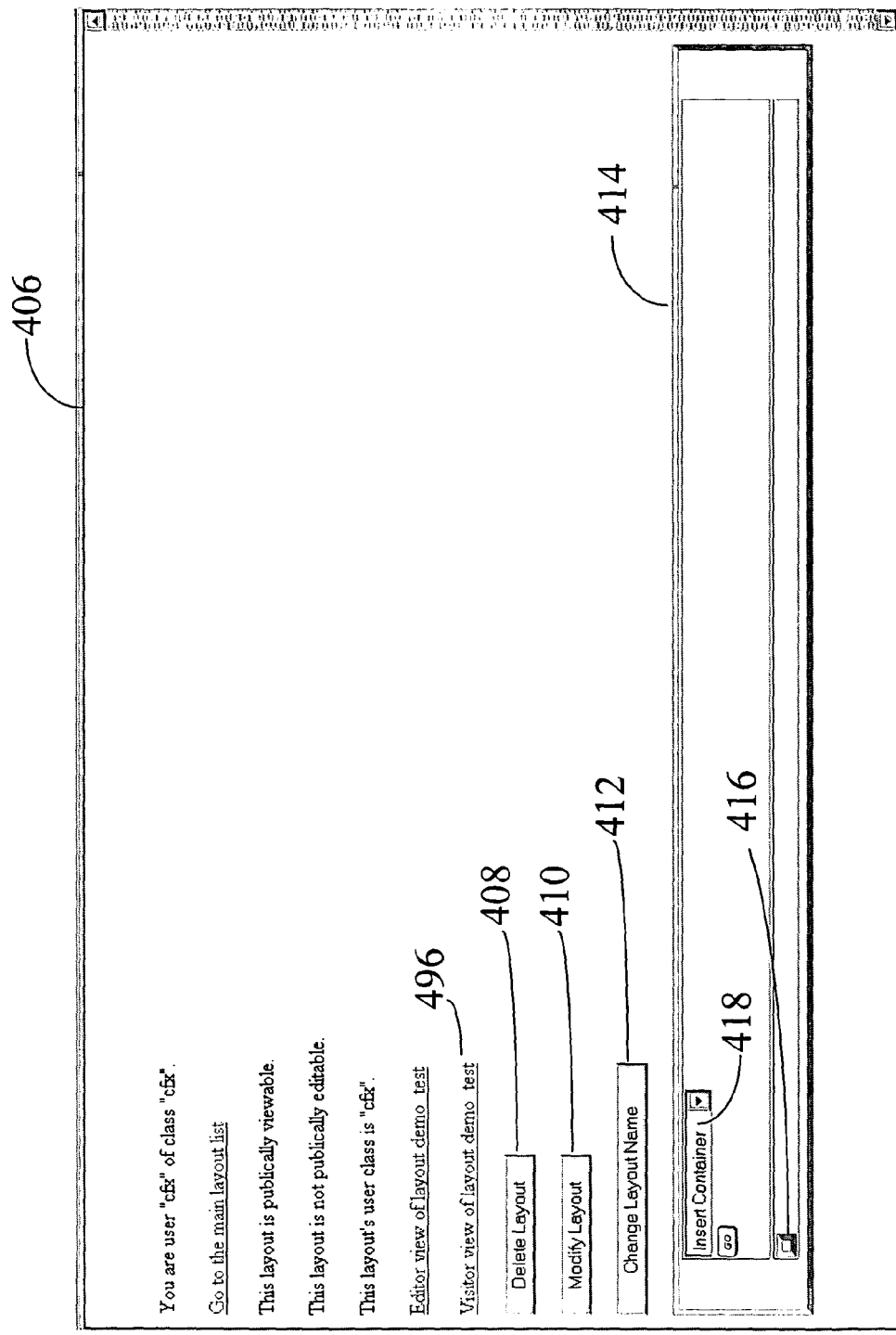
FIGS. 4A-4T are screen shots that illustrate the generation of a presentation in a platform and language independent manner in accordance with one embodiment of the present invention.

FIG. 4B shows the web page 406 that results when the submit button of form 402 is selected by a user. Web page 406 contains operations that can be performed on the entire layout. These operations includes delete layout operation 408, modify layout operation 410, and change layout name operation 412. Inside bordered box 414 is top split 416, along with dropdown menu 418 that contains menu options for all of the operations that can be performed on top split 416.

Figure 4C:
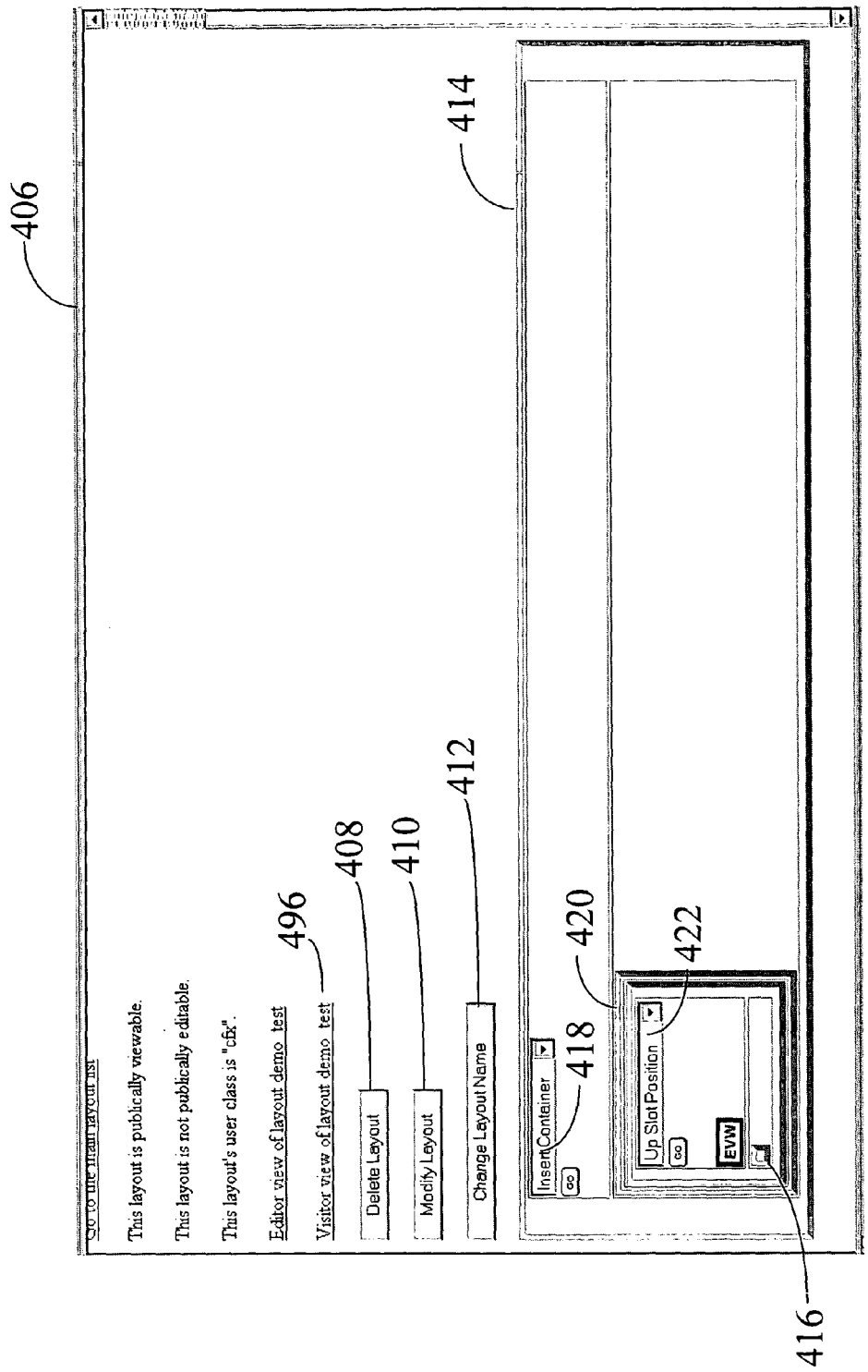

FIG. 4C shows the results of inserting split 420 into top split 416. Split 420 is inserted in top split 416 by selecting the "insert container" option from dropdown menu 418. There are now two dropdown menus, one for the top split 416 (menu 418) and one for split 420 (menu 422). Split 420 is a child of top split 416. When split 420 was created, a new row was added to layoutdata table 84 (FIG. 2) using the procedures described in Section 5.2, above. The parent identifier in the new row in layoutdata table 84, corresponding to split 420, is assigned the split_id of top split 416.

Figure 4D:
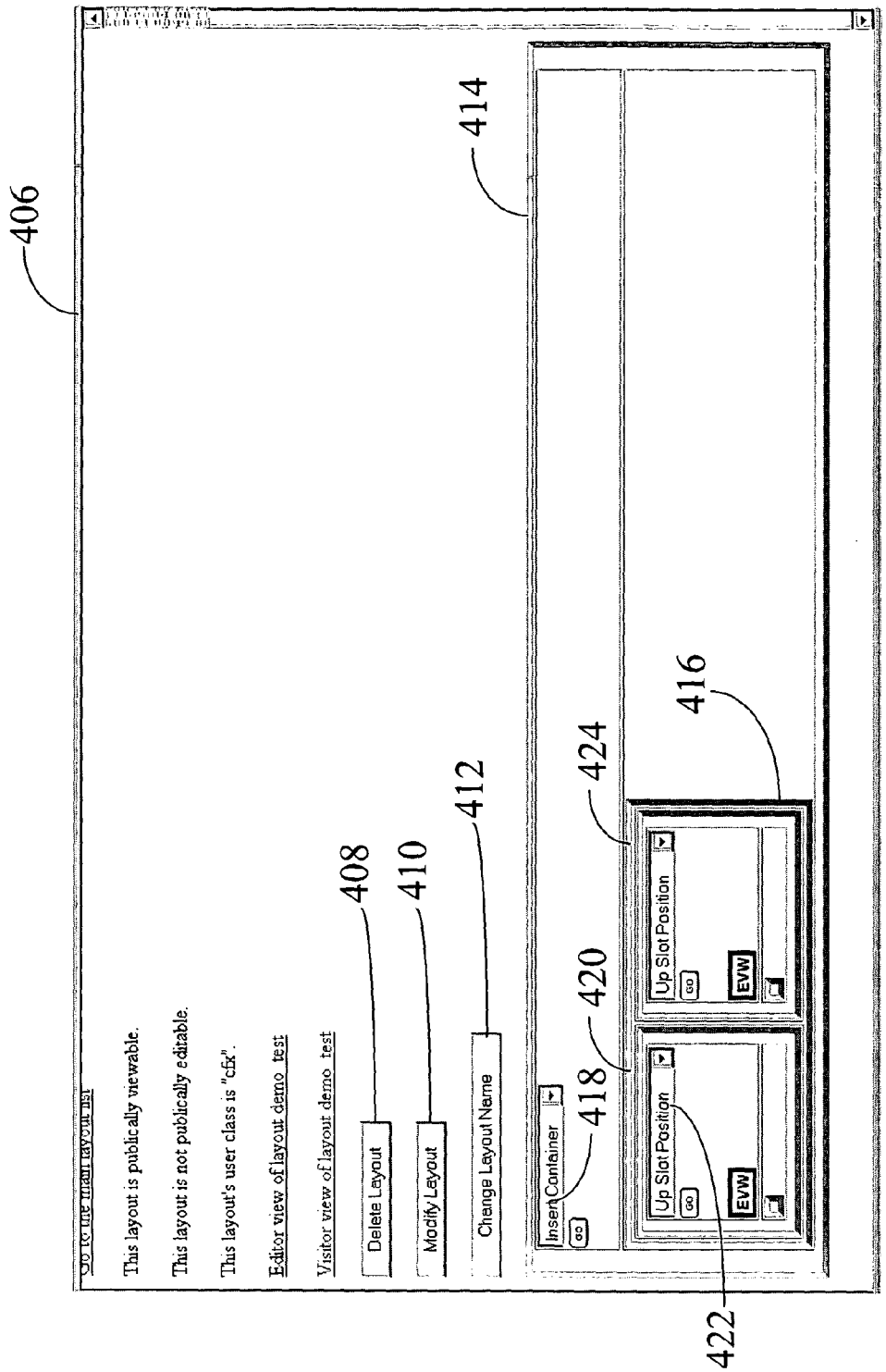

FIG. 4D shows the results of inserting a second split (split 424) into top split 416. Split 424 is inserted in top split 416 by selecting the "insert container" option from dropdown menu 418. When split 424 was created, a new row was added to layoutdata table 84 (FIG. 2) using the procedures described in Section 5.2, above. The parent identifier in the new row in layoutdata table 84, corresponding to split 424, is assigned the split_id of top split 416. At this point the borders of each split are more readily identifiable. The border of top split 416 is directly outside of and encircles for splits 420 and 424. Splits 420 and 424 are surrounded by their own border boxes.

Figure 4E:
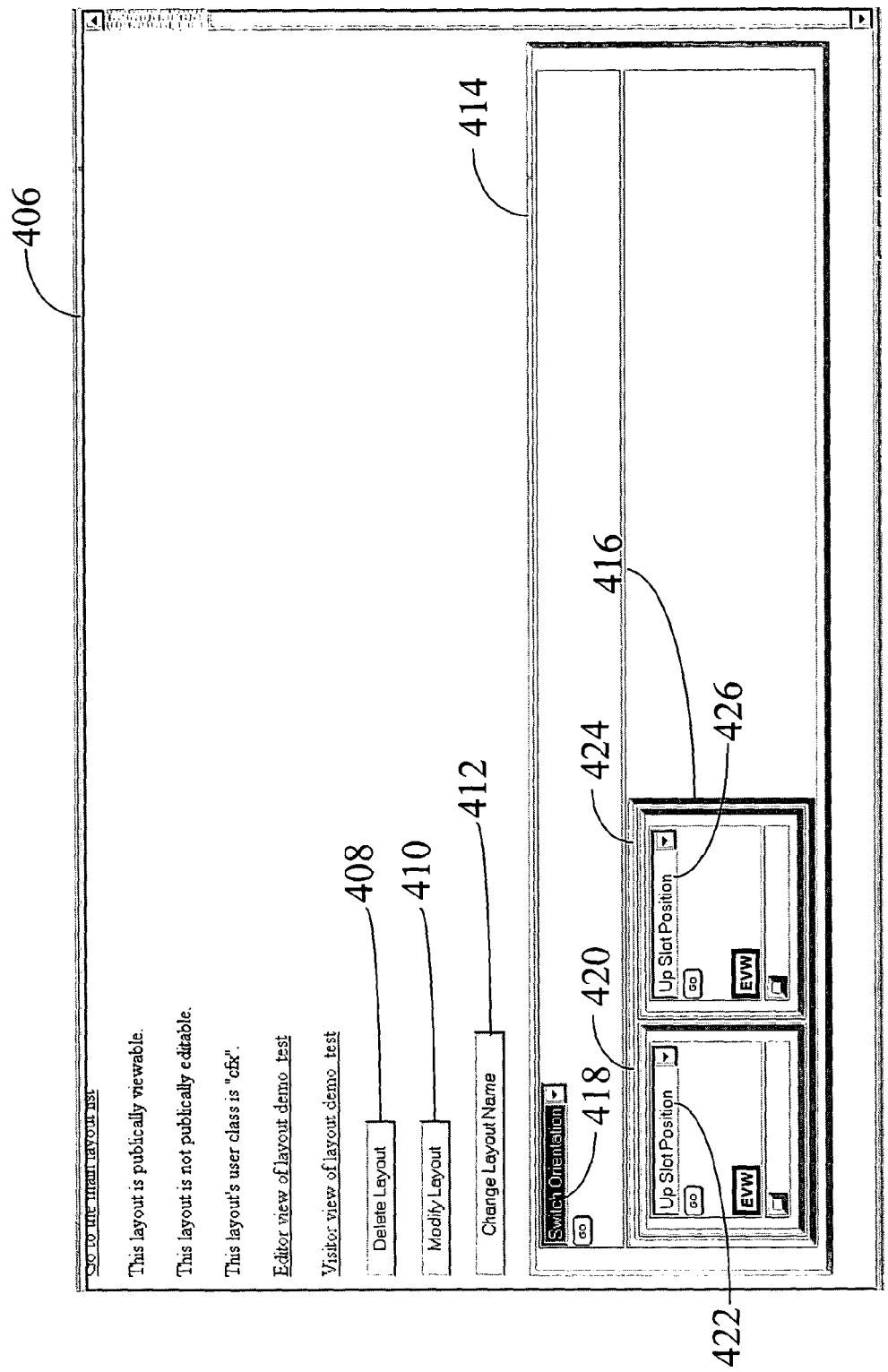
Figure 4F:
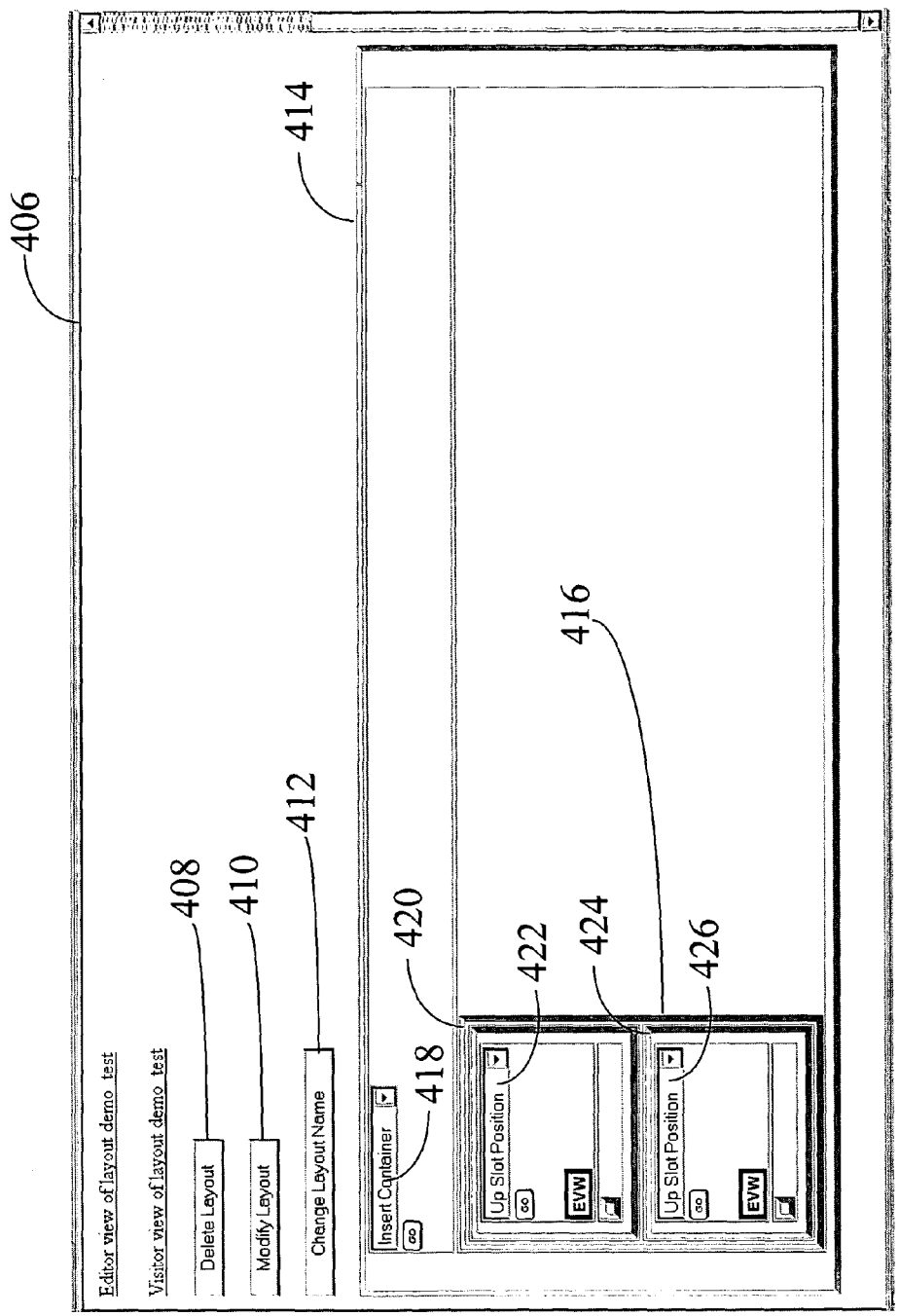

FIG. 4D provides a good illustration of the treemap algorithm that is used to create the presentations of the present invention. Splits are inserted either into top split 416 or into a split that is within top split 416 in a hierarchical manner. Each split at a given level in a branch of the hierarchy are either arranged in a row (as illustrated in FIG. 4D by splits 420 and 424) or they are arranged in a column. Menu options in the parent split designate whether the splits will be arranged in rows or columns. FIG. 4E illustrates this feature. In FIG. 4E, the user selects the dropdown option in menu 418 of the top split called "switch orientation". This changes the orientation of daughter splits 420 and 424. This new orientation is noted by changing the value in the "type" column of layoutsdata table 84 in the rows that correspond to splits 420 and 424. In one embodiment, the value in the "type" column of layoutsdata table 84 is defaulted to H for horizontal but can be toggled to V for vertical and back again by clicking the "switch orientation" button in the appropriate menu. The "type" parameter is referred to herein as an orientation parameter. FIG. 4F shows the results of changing the orientation of the daughter splits of top split 416 from horizontal to vertical.

Figure 4G:
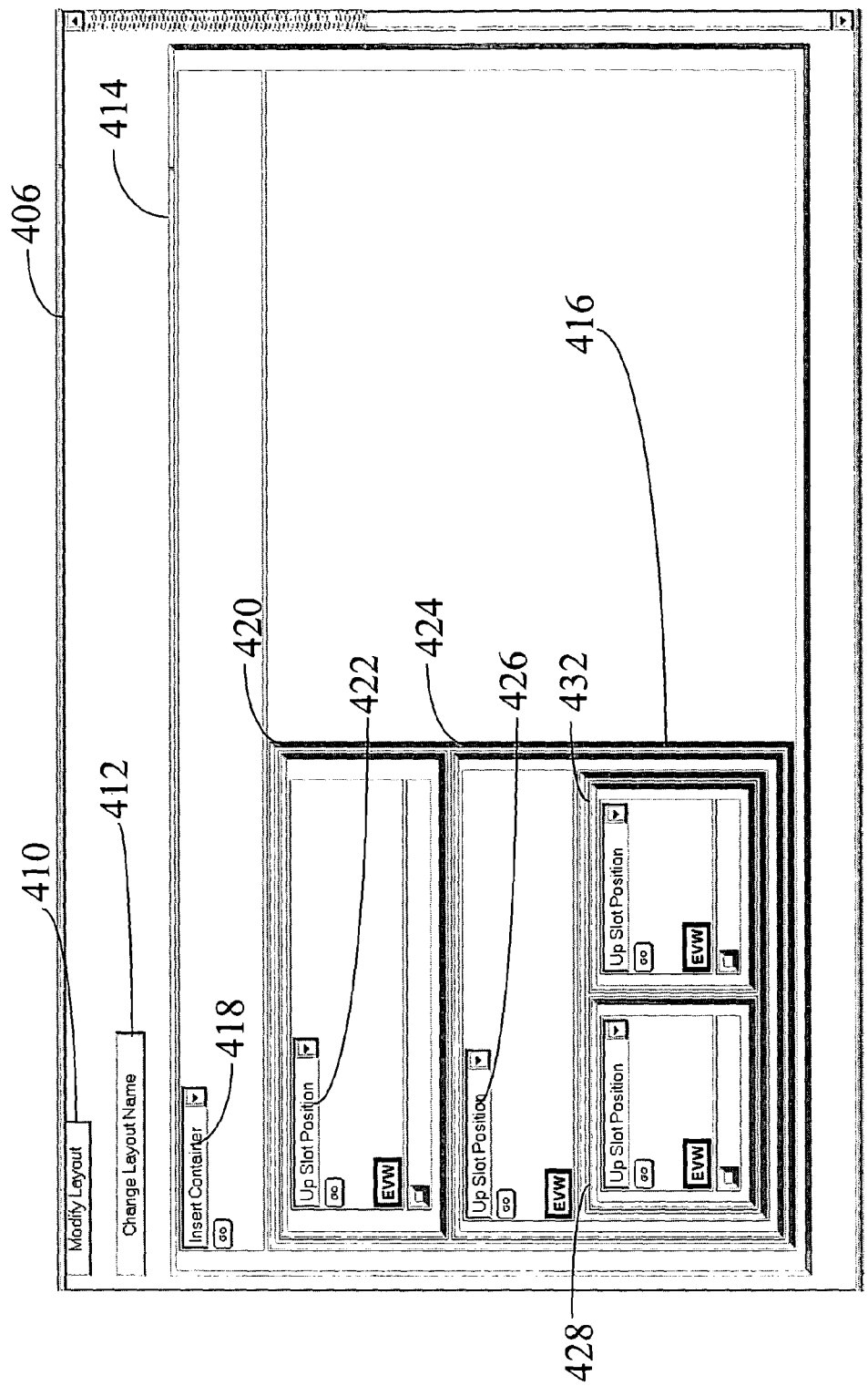

FIG. 4G shows the results of adding splits 428 and 432 inside split 424. As per the default, splits 428 and 432 are arranged horizontally within parent split 424. However, this arrangement can be changed to a vertical arrangement using menu 426.

Figure 4H:
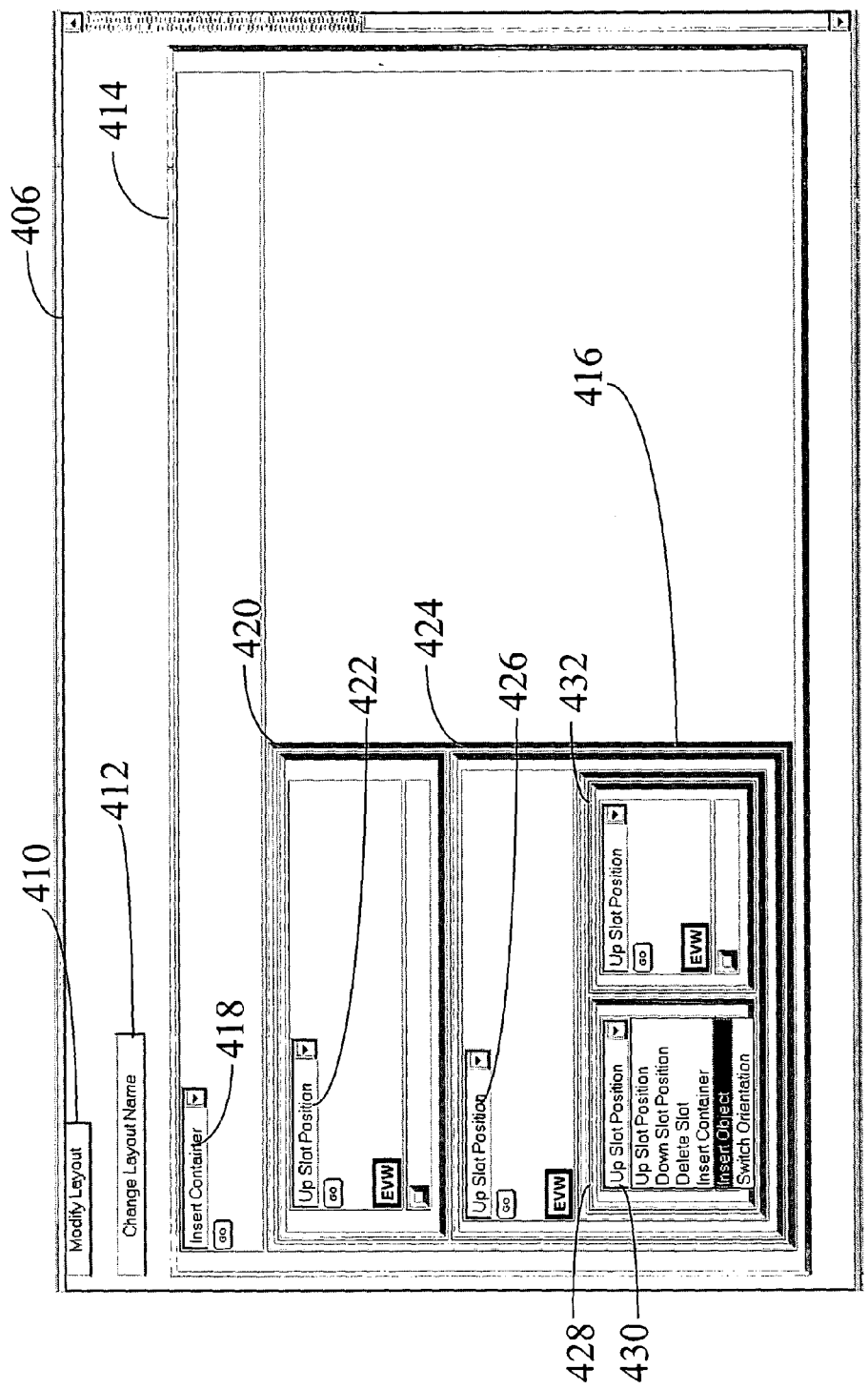

FIG. 4H shows the user selecting a dropdown option from menu 430 of split 428 in order to add a data split into split 428. The insertion of a data split is referenced by the menu option "insert object" in menu 430. Selection of the "insert object" menu option results in the creation of a row in layoutdata table 84 to record the data split in the same manner that the other splits were recorded in table 84 with one exception. The "type" field in table 84 for the newly created data split is assigned the type value of "D" for data. A type designation of "D" means that only an object can be contained inside the split, and additional splits cannot be inserted inside the split.

Users have the option to either "insert existing object" to insert previously created data into a data split or "create new object" to insert a new object into a data split. FIG. 4I illustrates a page 440 where the user can select the type of new object to insert into the data split created by action taken in FIG. 4H. Specifically, the user can insert an entire layout (but not a split), text, a gallery, and a blog.

Figure 4J:
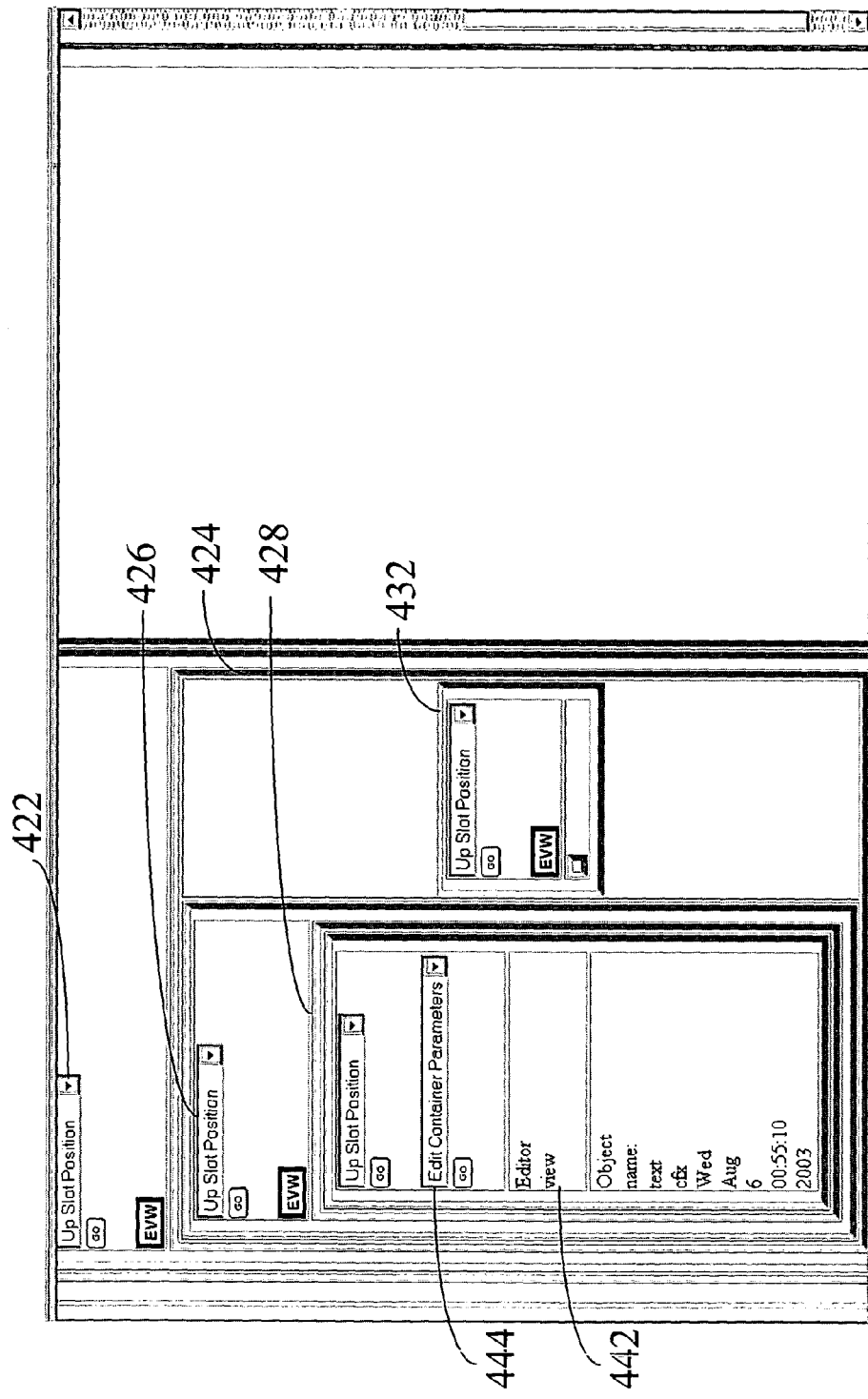

FIG. 4J is a close up of splits 428 and 432 after the user has selected to insert a new "text" object into data split 442. Specifically, inside split 428, there is a holder for data split 442 that displays some meta-information about the object. The creation of a new object, as illustrated by FIGS. 4I and 4J, causes the creation of a row in objects table 92 and a row that corresponds to the object in views table 88 of database 66. Every data split that has an object also has a view that is unique to that data split. At this step, the text object has been created, but no information has been entered into the object.

Figure 4K:
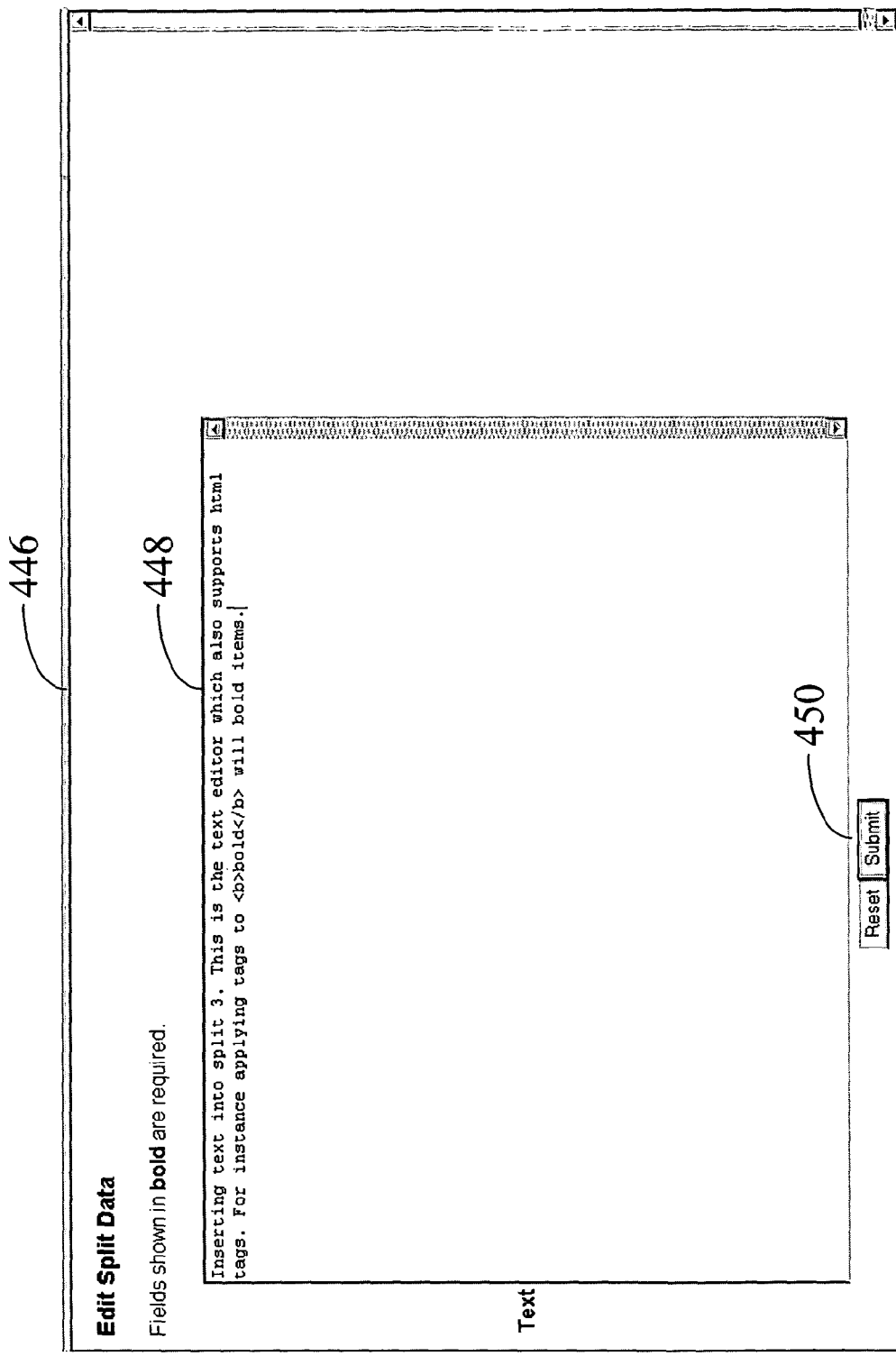
Figure 4L:
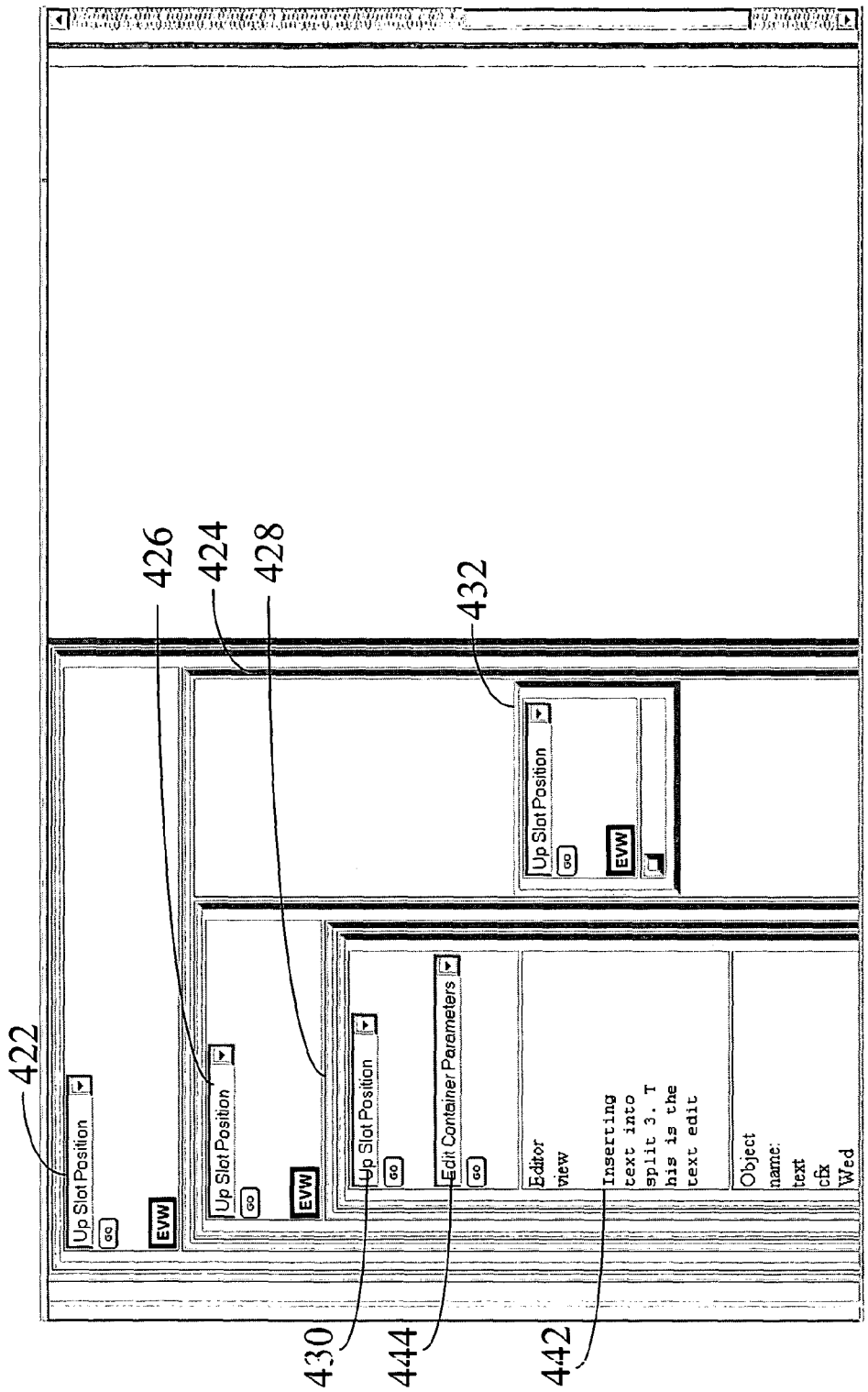
Figure 4M:
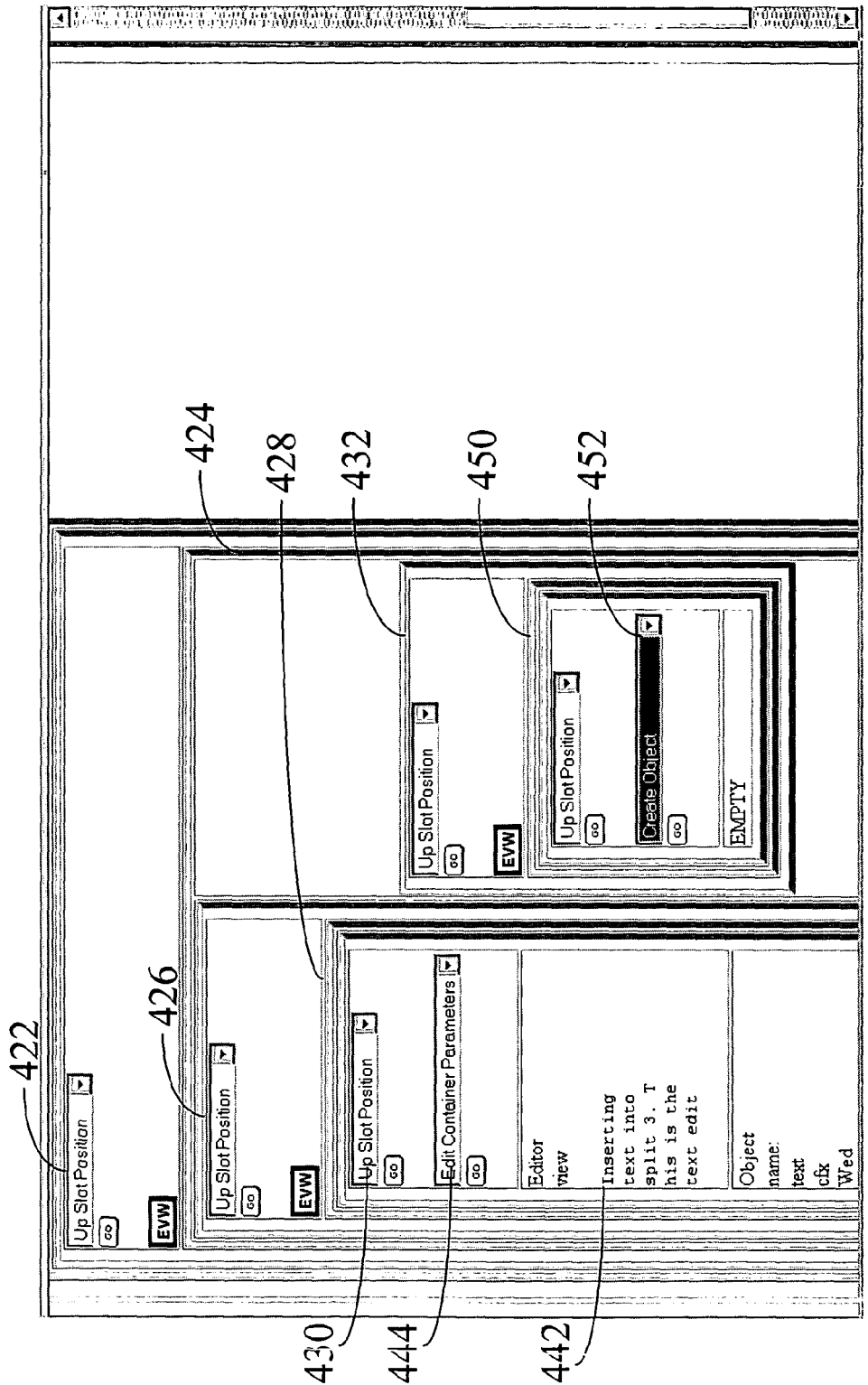

To enter information, the user selects the "modify text object" option from menu 444. This will bring the user to form 446 (FIG. 4K). The user enters information into box 448 and then hits submit button 450. Submitting form 446 creates an action that, when executed, updates the obj_data field for the row in objects table 92 that represents the object. A text object is a simple object so all of the data for that object is contained in objects table 92. FIG. 4L is a close-up of data split 442 after the text entered into box 448 (FIG. 4K) has been associated with the data split. A small preview of the text entered is displayed inside data split 442.

Figure 4N:
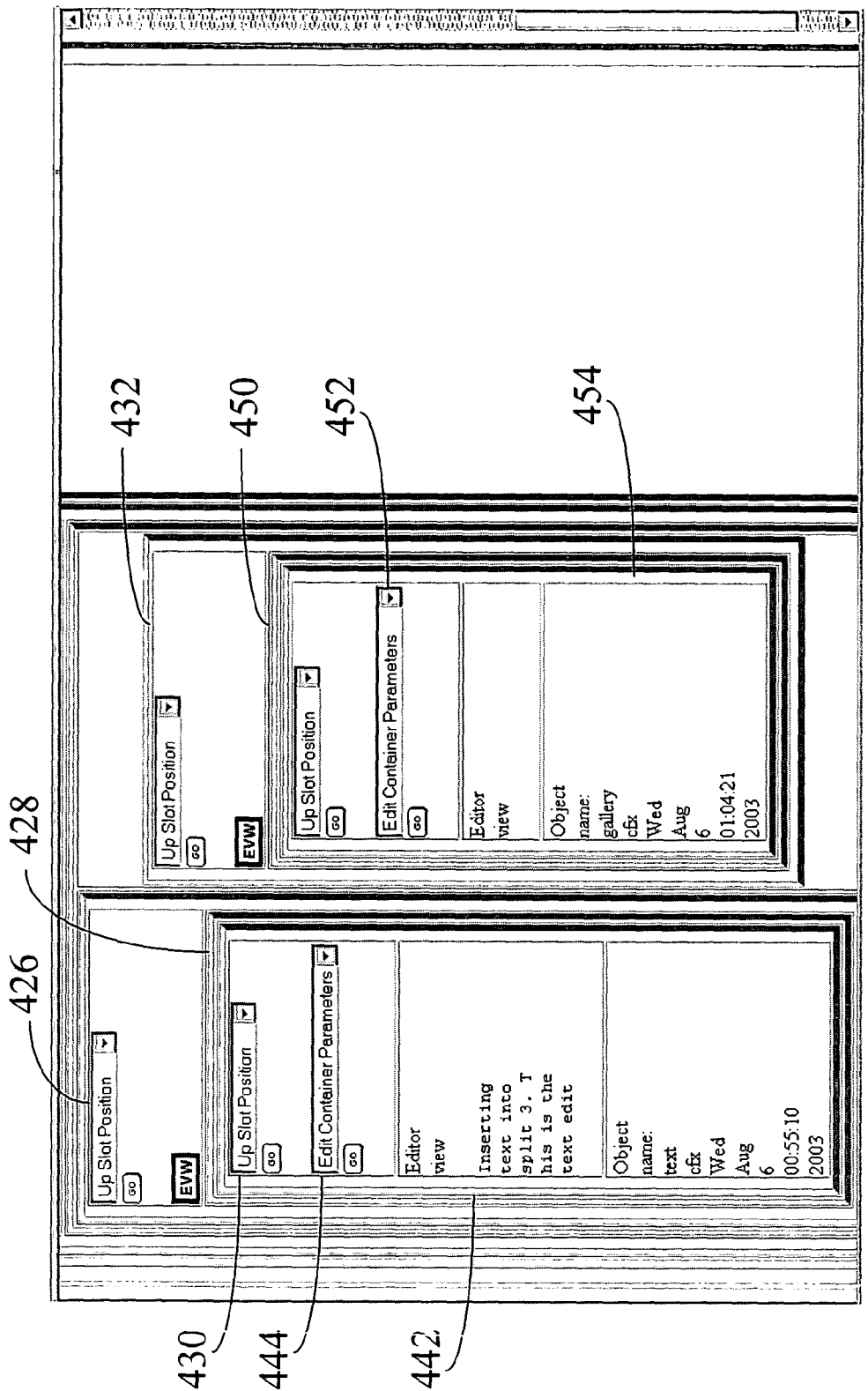
Figure 40:
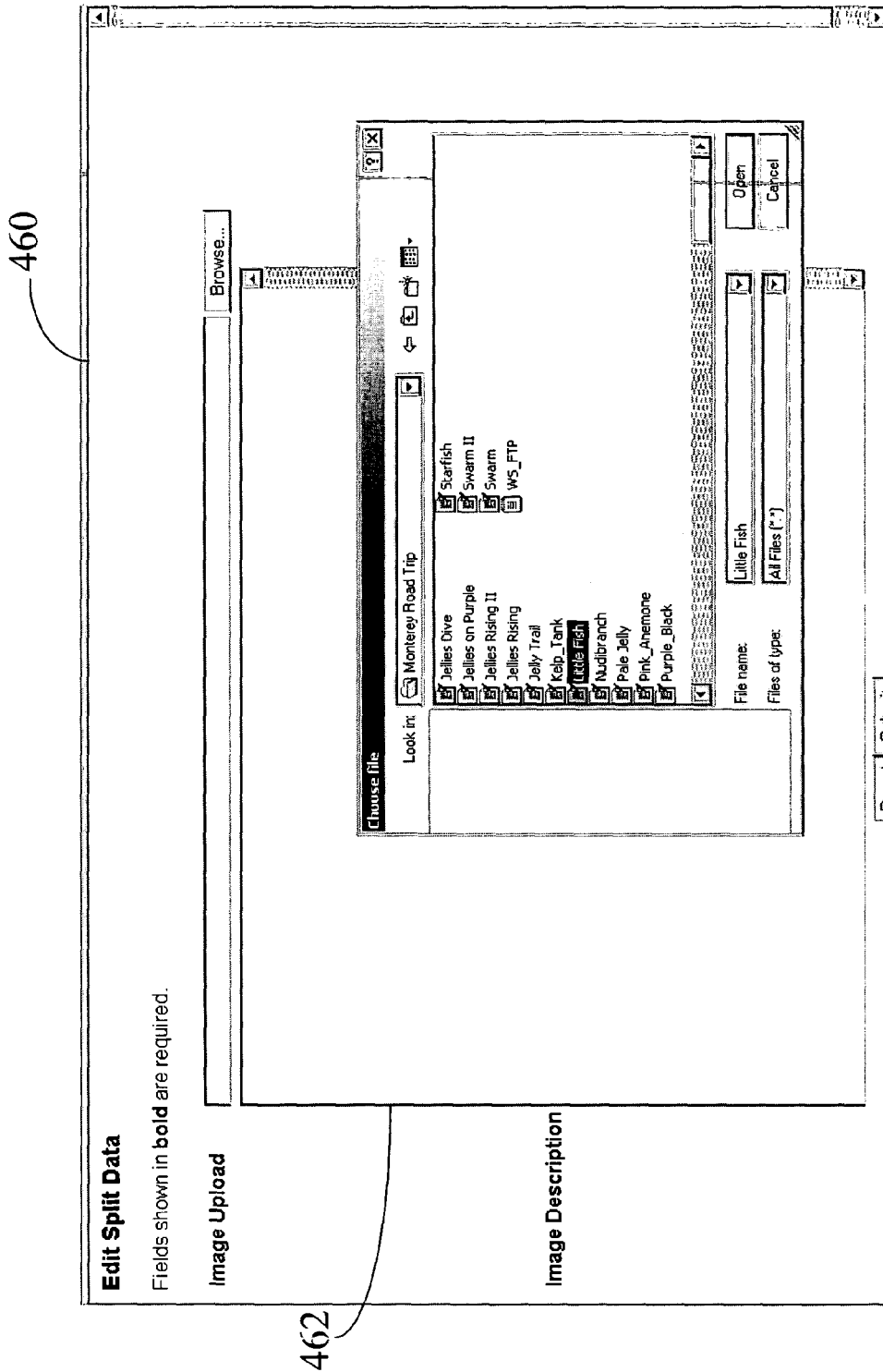

FIG. 4M illustrates the instance where the user has created a data split 450 inside split 432 in the same manner as data split 442 was created in split 428. Further, FIG. 4M illustrates how the user has selected to the create an object option from the menu 452 associated with data split 450. Upon submitting the "create object" option, the user is brought to the page displayed in FIG. 4I. At this point, the user selects the "gallery" option and hits the submit button. This submission creates an action in action table 72 that, when executed, creates a row in objects table 92, and a row in views table 88 for the gallery. FIG. 4N provides a close up view of splits 428 and 432. The holder 454 for data split 450 is now seen in split 432. Holder 454 displays meta-information about the object. However, none of the fields in the meta-information are populated at this stage because the user has not provided the information. To provide such information, the user selects the option to "upload an image" from menu 452 (menu option not shown). This action takes the user to the upload image page 460 of FIG. 4O. Page 460 allows the user to browse their computer or, more preferably, any computer addressable by system 20, and select an image to upload into the gallery. There is also an open text field 462 where a description of the image can be added.

A photo gallery object is a complex object meaning that multiple pieces of data make up the object. This complexity requires that a separate table, called gallerydata table 96 (FIG. 2), store each individual picture that makes up the gallery object. Thus, there is a one to many relationship between rows in objects table 92 and rows in gallerydata table 96. In some embodiments, uploading an image saves the image to file system 42. In other embodiments, the image is not uploaded to file system 42. Rather, the address of the image in system 20 is noted. Regardless of whether the image is uploaded to file system 42, a row is written to the gallerydata table 96 upon execution of the action. The newly added row in the gallerydata table 96 contains the field "image_url" that records the path to where the image is stored in system 20. Further, the newly added row in the gallerydata table 96 includes a lookup field entitled "object_id" to the object in object table 92 that it belongs to, and other information such as the image description (image_name, image_position).

FIG. 4P shows gallery parameters editing page 470 that can be invoked for any gallery object. Between FIG. 4O and FIG. 4P, the user has uploaded three more images into the gallery in the same manner as described in screenshot FIG. 4O. The user then selected the "edit container parameters" option of the dropdown menu 452 of data split 450 to get the gallery parameters editing page 470 of FIG. 4P. Page 470 allows the user to change the display parameters associated with the gallery. The gallery height and gallery width options, which can be modified by the user, respectively determine the number of rows and the number of columns of images that are to be displayed in the associated gallery. Further, the thumbnail width and thumbnail height options, which can also be modified by the user, determine the thumbnail size of all images displayed in the associated gallery.

As described above, each data split has its own view that determines the style properties to associate with that data split. The object inside the data view will determine what style properties are available. Some objects, like a text object, can store all of those properties in columns in views table 88, but some object types, like the gallery object, require an additional table to support more specific style property instructions. Setting the gallery width, gallery height, thumbnail width, and thumbnail height values as done in FIG. 4P creates a row in galleryviews table 90. Table 90 has one column that serves as a key to the views table (view_id), and then a column for each property value (x, y, thumb_x, and thumb_y). In other words, when the user submits page 470, the information is stored as an action in actions table 72. Then, when the action is executed, the x, y, thumb_x, and thumb_y fields of the row in the galleryviews table 90 that corresponds to the view for the gallery is modified with the updated values.

Figure 4Q:
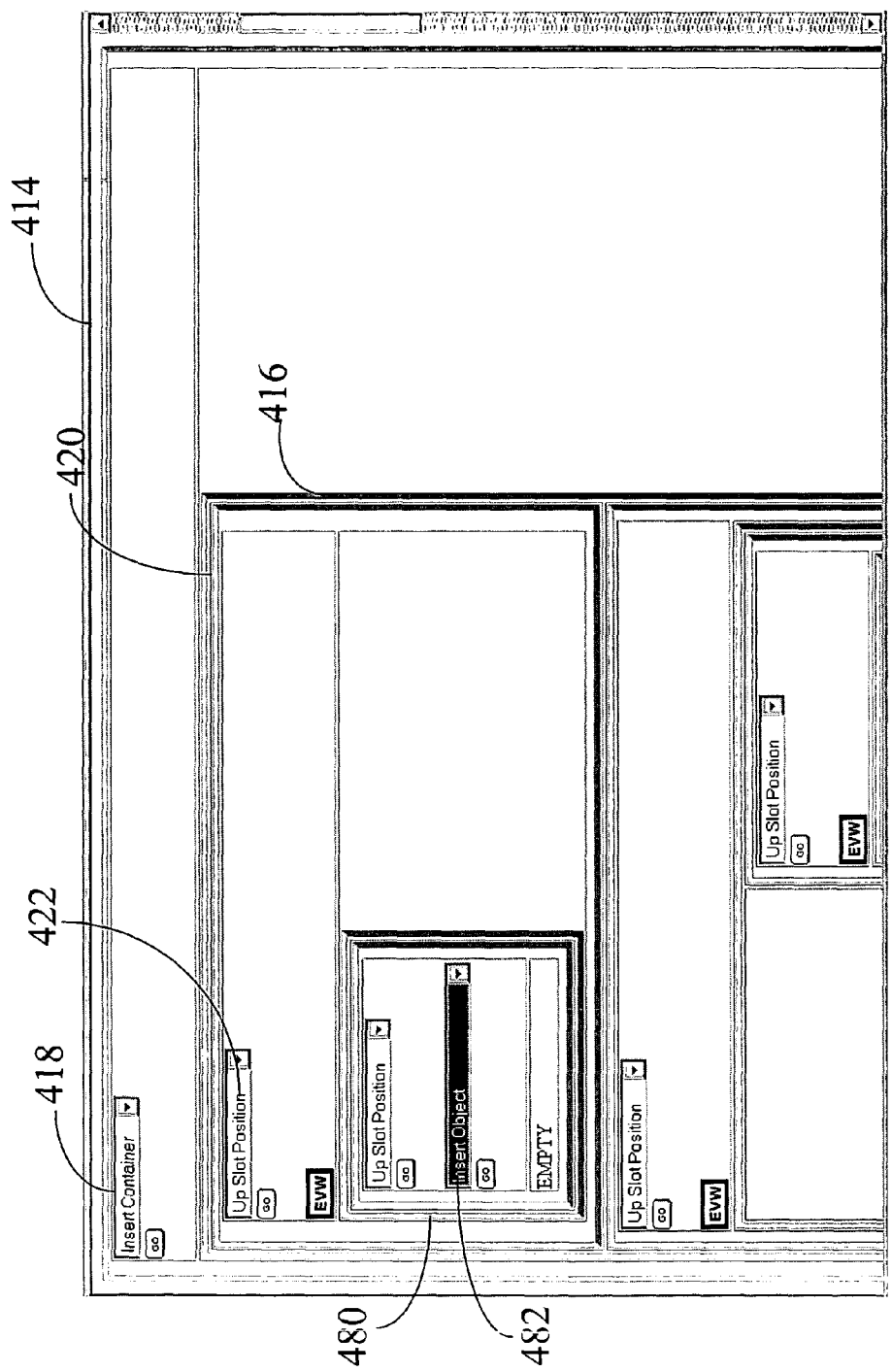

FIG. 4Q a close up of 420. The user is selecting the "insert object" option from dropdown menu 422. This creates data split 480 within split 420. Instead of selecting the "create new object" option that was shown previously, the user selects the "insert existing object" from the dropdown menu 482 of data split 420. This brings the user to page 490 where the desired object can be selected from a dropdown display 490 of that user's objects (FIG. 4R).

Figure 4R:
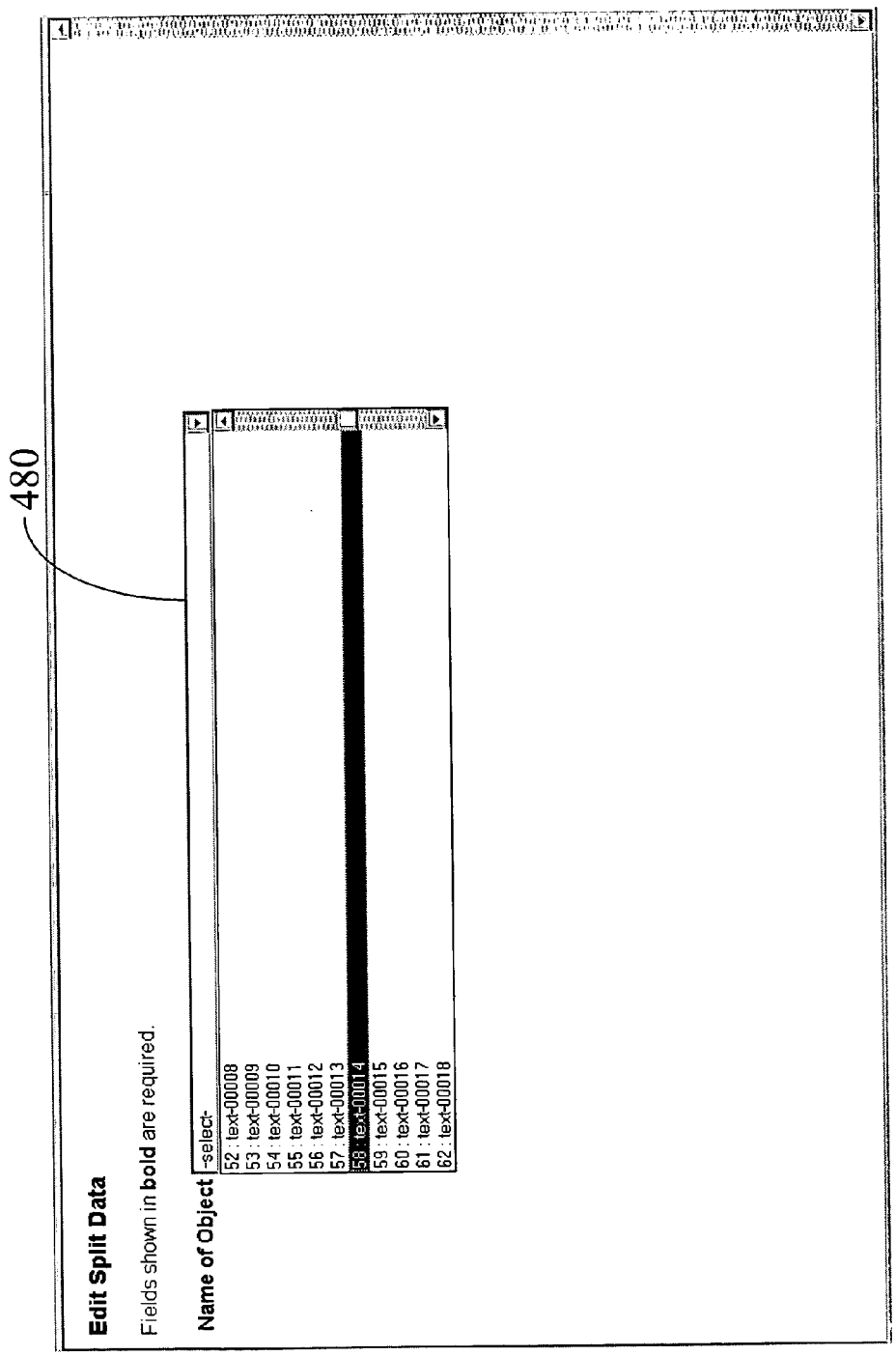
Figure 4S:
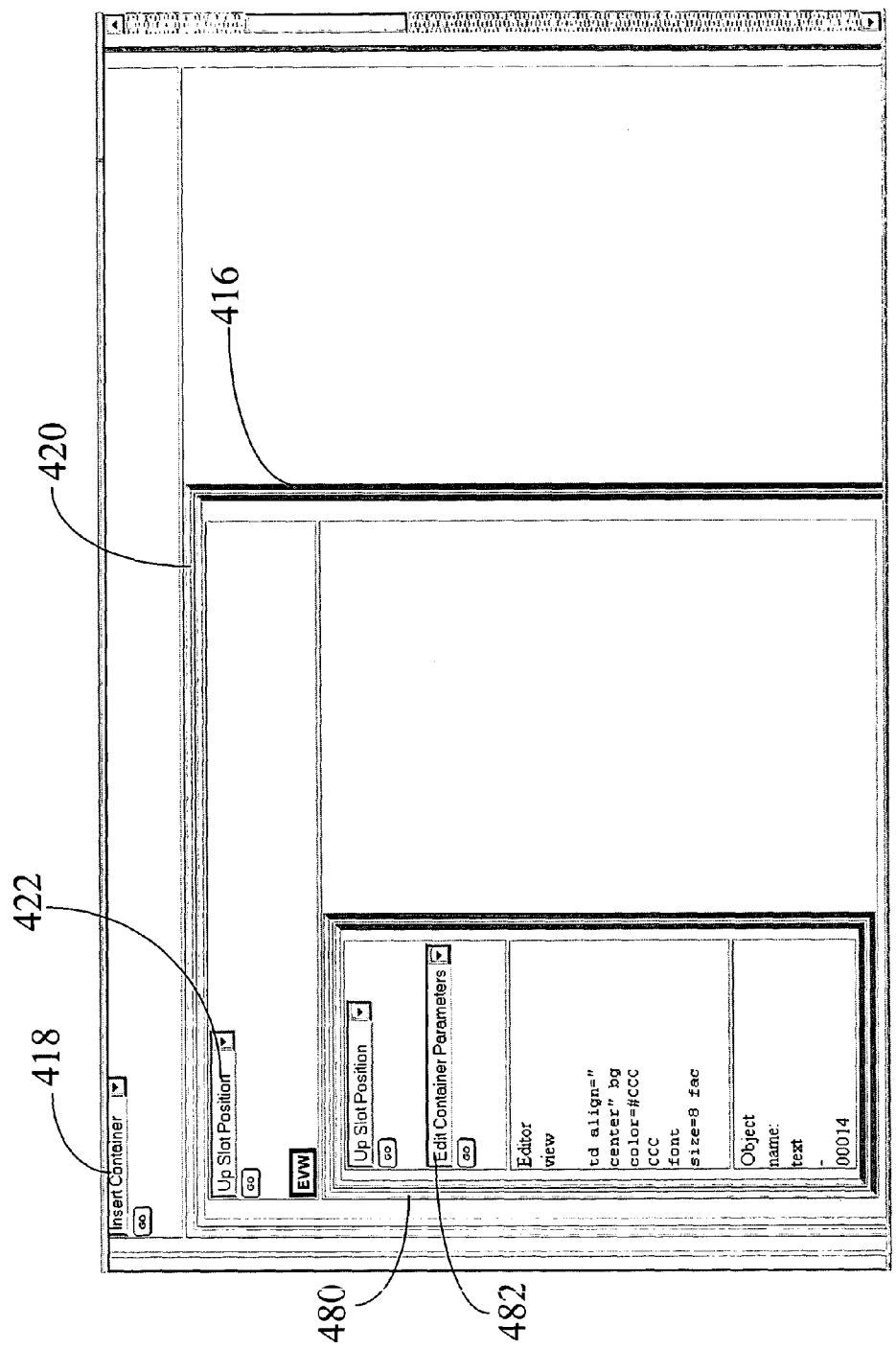
Figure 4T:
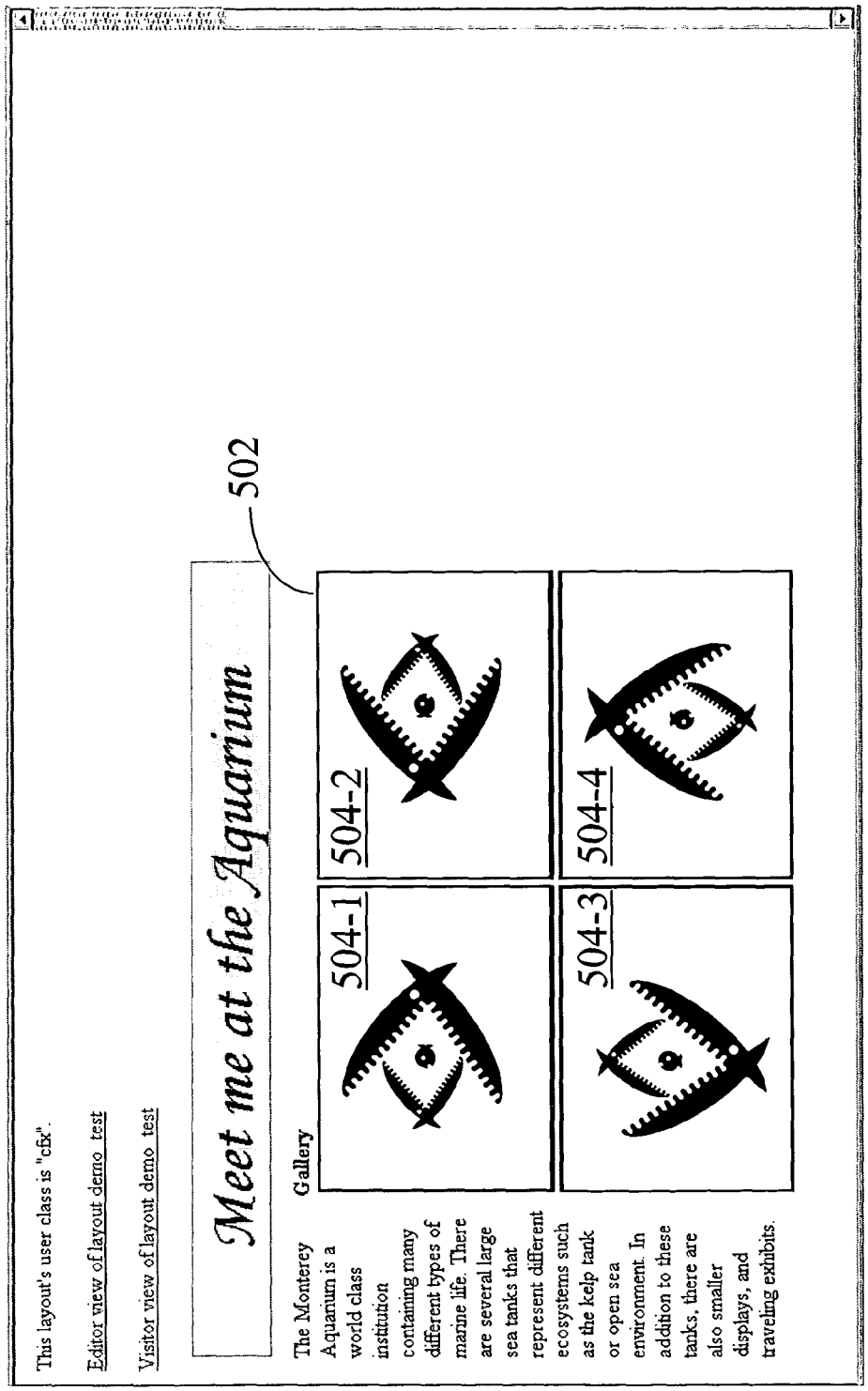

As illustrated in FIG. 4R, the user selects object 00014 and hits a submit button. This creates an action in actions table 72 (FIG. 2). When the action is executed, a row in views table 88 is created. The newly created row stores the object_id for object 00014. FIG. 4S is a close up of split 420 after the existing object has been added to data split 480 Top split 416 now contains split 420 and split 424. Split 420 contains data split 480 that has an object and a view of that object inside it. As illustrated in FIG. 4G, split 424 contains split 428 and split 432. As illustrated in FIG. 4J, split 428 contains data split 442 that has an object and a view of that object inside it. As illustrated in FIG. 4N, split 432 contains data split 450 that has an object and a view of that object inside it.

The user has finished creating the layout and is now ready to view it as an HTML page. The user selects the "Visitor view of layout demo_test" link 496 at the top of the main work page (FIG. 4C). As a result, a layout collection process takes place and the layout tree is converted to HTML steps in accordance with step 302 through 316 of FIG. 3A. The full HTML version of the newly created layout is illustrated as FIG. 4T.

5.4. Exemplary Operation Processing

The following is an example of the steps taken when a user submits form 470 of FIG. 4P. In this case, the operation that is being performed is operation_id=30 which is gallery view editing. Gallery view editing is a form of a complex operation. Operations table 76 stores information relating to the top level of this operation. In particular, the type column of operations table 76 indicates that operation_id=30 modifies a view and, more particularly, the subtype column of operations table 76 indicates that operation_id=30 affects a gallery. Thus, the values in the row in operations table 76 that is created upon submission of form 470 are as described in Table 2 below.

TABLE 2

| | values in operations table 76 | | | | |
|---|---|---|---|---|---|
| operation_id | Name | text | button | type | subtype |
| 30 | EDIT_VIEW_GALLERY | Edit Gallery View Parameters | | view | gallery |

As seen in FIG. 4P, operation_id=30 updates four fields. They are gallery width, gallery height, thumbnail width, and thumbnail height. Each of these fields is represented by a unique row in operationparameters table 78 (FIG. 2) that is created upon submission of form 470. Thus, for operation_id=30, the entries shown in Table 3 are placed in operationparameters table 78.

TABLE 3 values in operationsparameters table 78

| operation_id | name | text | Magic |
|---|---|---|---|
| 19 | X | Gallery Width | Tabla::DBI::View::Gallery-> retrieve($id)->x(NEWDATA) |
| 20 | Y | Gallery Height | Tabla::DBI::View::Gallery-> retrieve($id)->y(NEWDATA) |
| 21 | thumb_x | Thumbnail Width | Tabla::DBI::View::Gallery-> retrieve($id)-> thumb_x(NEWDATA) |
| 22 | thumb_y | Thumbnail Height | Tabla::DBI::View::Gallery-> retrieve($id)-> thumb_y(NEWDATA) |

The "text" field in each of these four rows displays the corresponding field name seen in the screenshot. So, for example, the "text" field for the row in operationparameters table 78 that represents the gallery width field will be "Gallery Width", the "text" field for the row in operationparameters table 78 that represents the gallery height field will be "Gallery Height" and so forth.

A modification to gallery width is operation_id=19. The name field for the row in table 78 corresponding to operation_id=19 has a value "X" that represents how many images across a gallery view should be displayed in the presentation. The modification to gallery height is operation_id=20. The name field for the row corresponding to operation_id=20 has a value of "Y" that represents how many images down a gallery view should be displayed in a presentation. A modification to thumbnail width is operation_id=21. The name field for the row corresponding to operation_id=21 has a value of "thumb_x" that specifies the width, in pixels, of all image in the gallery object. A modification to thumbnail width is operation_id=22. The name field for the row corresponding to operation_id=22 has a value "thumb_y" that specifies the height, in pixels, of all images in the gallery.

When a user enters information into all four fields in form 470 of FIG. 4P and hits submit, an operation_id=30 row is created in actions table 72:

TABLE 4 values in action table 72

| action_id | operation | target | Date | session_id |
|---|---|---|---|---|
| 1808 | 30 | 311 | 1061272184 | adef0384be7cb2609792af6e70c9f900 |

The Tabla::DBI::Action module (Table 1) creates this row. The value "30" in the "operation" column specifies that the operation is editing a gallery view and the value "311" in the "target" column specifies that the gallery view that is being modified is view_id 311. The identity of the table that the target is pointing to (galleryviews table 90) is known because operation 30 is specific to table 90. The date of the action and the session committing the action are also stored in the newly created operation_id=30 row in actions table 72.

Correspondingly, four rows are created in actionparameters table 74, one for each field in the form:

TABLE 5 values in actionparameters table 74

| parameter_id | action_id | data | operation parameters |
|---|---|---|---|
| 1841 | 1808 | 2 | 19 |
| 1842 | 1808 | 2 | 20 |
| 1843 | 1808 | 225 | 21 |
| 1844 | 1808 | 200 | 22 |

In some embodiments, edit_split_data.pl script 48 (FIG. 1) creates the four rows in actionparameters table 74. The "parameter_id" column is a unique value for each action parameter. The value in the "action_id" field of each of the fours rows is a link to the parent action in action table 72. Thus the value in this field will be identical for all four action parameters. The "data" column contains the data entered into each field by the user of form 470. The "operation_parameters" column in actionparameters table 74 (Table 5) is used to join over to the corresponding rows in operationparameters table 78 (Table 3) to identify what fields were updated in the form and what target database table is to be updated.

Now that the relevant database tables that are affected by a complex action have been outlined, a process for applying this action in order to update the target tables in database 66 will be described for one of the rows in actionparameters table 74. This process is repeated for each row in actionparameters table 74 (Table 5). The process will be illustrated for the action with parameter_id 1843, which changes the width of all thumbnails in the target gallery object to 225 pixels. In order to accomplish this, the "thumb_x" field for the row in galleryviews table 90 (FIG. 2) that corresponds to the correct target view needs to be updated.

Once edit_split_data.pl module 48 has written a row for each action parameter in actionparameters table 74, it invokes the Tabla::DBI::Action method do-action( ). Method do_action( ) is responsible for updating the rows in database 66 based on any unprocessed actions in actions table 72. Method do_action( ) accomplishes this by first determining the target of a subject action parameter (the action with parameter_id 1843 in Table 5). To get this information, do_action( ) relies on the "target" field for the action in action table 72 (Table 4) corresponding to the action parameter, in actions table 72, as well as the corresponding "magic" field for the action parameter in operationparameters table 78. The magic field in operationparameters table 78 contains a string of Perl code that invokes a module and inserts parameters that do_action( ) knows how to handle and apply. In this case, the Tabla::DBI::View:: Gallery module is invoked and passed three parameters: the "target" from the actions table 72 (Table 4), which goes in "retrieve( $id)", the column to be updated "thumb_x" which is specified in the magic code string, and the data from actionparameters table 74 (Table 5) to update the column.

Based on that data, Tabla::DBI::View::Gallery knows to update, to the value of 225, the "thumb_x" field in the row of galleryviews table 90 representing view_id "311". This process is repeated for each of the remaining actionparameters in actionparameters table 74 (Table 5) in order to update the target gallery view in galleryviews table 90. As a result, the target gallery view will be a two by two display with thumbnails that are 225 by 200 pixels in the presentation.

6. REFERENCES CITED

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product can also be distributed electronically, via the Internet or otherwise, by transmission of a computer data signal (in which the software modules are embedded) on a carrier wave.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A computer system for storing a layout comprising a hierarchy of splits, the computer system including:
   a central processing unit;
   a memory, coupled to the central processing unit, the memory storing:
   (A) a layout table that includes a row for storing an identity of said layout and an identity of the top split in said hierarchy of splits, wherein said hierarchy of splits includes one or more parent splits spatially encompassed within said top split and each split in said hierarchy of splits, other than said top split and said one or more parent splits spatially encompassed within said top split, is spatially encompassed within a display defined by said parent split in said one or more parent splits; and
   (B) a layoutdata table that includes a row for each split in said hierarchy of splits, wherein each respective split stored in said layoutdata table, other than the top split comprises:
      (i) a parent field that specifies the parent split of the respective split; and
      (ii) a type field that specifies whether the respective split is a data split and, when the respective split is not a data split, defines an orientation of the respective split spatially encompassed within the parent split of the respective split; and
   a display that displays a translation of the hierarchy of splits as a webpage using a target language wherein each split in said hierarchy of splits, other than said top split, is spatially encompassed within another split within said hierarchy of splits.

2. The computer system of claim 1 wherein the orientation is horizontal or vertical.

3. The computer system of claim 1 further comprising:
   a views table for storing a different view for each data split in said split hierarchy, wherein each said different view references an object; and
   an objects table for storing each said referenced object.

4. The computer system of claim 3 wherein an object in said objects table is a text object, a blog object, or a gallery object.

5. The computer system of claim 4 wherein the object is a blog object, the computer system further comprising a blogdata table for storing each blog entry in said blog object.

6. The computer system of claim 4 wherein the object is a gallery object, the computer system further comprising a gallerydata table for storing each image in said gallery object.

7. The computer system of claim 1, further comprising an actions table that comprises each operation on said layout that is performed by a user.

8. The computer system of claim 1, wherein the target language is HTML, XML, or text.

9. The computer system of claim 1, wherein the translation of the hierarchy of splits is cached as a static document.

* * * * *